United States Patent
Takei et al.

(10) Patent No.: US 12,057,887 B2
(45) Date of Patent: Aug. 6, 2024

(54) OPTICAL TRANSMITTER

(71) Applicant: Sumitomo Electric Device Innovations, Inc., Yokohama (JP)

(72) Inventors: Ryutaro Takei, Yokohama (JP); Takayuki Suzuki, Yokohama (JP)

(73) Assignee: Sumitomo Electric Device Innovations, Inc., Yokohama (JP)

( * ) Notice: Subject to any disclaimer, the term of this patent is extended or adjusted under 35 U.S.C. 154(b) by 0 days.

(21) Appl. No.: 17/913,736

(22) PCT Filed: Mar. 26, 2021

(86) PCT No.: PCT/JP2021/012904
§ 371 (c)(1),
(2) Date: Sep. 22, 2022

(87) PCT Pub. No.: WO2021/193926
PCT Pub. Date: Sep. 30, 2021

(65) Prior Publication Data
US 2023/0379060 A1 Nov. 23, 2023

(30) Foreign Application Priority Data
Mar. 26, 2020 (JP) .................................. 2020-056207

(51) Int. Cl.
*H04B 10/50* (2013.01)
*H04B 10/516* (2013.01)

(52) U.S. Cl.
CPC ......... *H04B 10/503* (2013.01); *H04B 10/516* (2013.01)

(58) Field of Classification Search
None
See application file for complete search history.

(56) References Cited

U.S. PATENT DOCUMENTS

| 2010/0073063 | A1 | 3/2010 | Lakshmikumar et al. |
| 2015/0188627 | A1 | 7/2015 | Yuda et al. |
| 2017/0093116 | A1* | 3/2017 | Zhang ........................ H01S 3/10 |

(Continued)

FOREIGN PATENT DOCUMENTS

| JP | S58-218014 A | | 12/1983 |
| JP | S58218014 A | * | 12/1983 |
| JP | H8-288905 A | | 11/1996 |

(Continued)

*Primary Examiner* — David W Lambert
(74) *Attorney, Agent, or Firm* — McCarter & English, LLP; Michael A. Sartori

(57) ABSTRACT

An optical transmitter includes an optical transmission unit, a drive unit, an arithmetic circuit, and a bias supply circuit. The optical transmission unit includes a laser element. The drive unit drives the laser element according to a first transmission signal. The arithmetic circuit generates a second transmission signal. The bias supply circuit superimposes the second transmission signal on a bias current of the laser element. An output of the arithmetic circuit containing the second transmission signal is a digital signal in a rectangular wave form based on a reference clock having a frequency lower than a reference clock frequency of the first transmission signal. The bias supply circuit includes a circuit element for inclining a rising portion and a falling portion of the output of the arithmetic circuit.

10 Claims, 18 Drawing Sheets

(56) References Cited

U.S. PATENT DOCUMENTS

2017/0093519 A1    3/2017  Deng

FOREIGN PATENT DOCUMENTS

| JP | H08288905 A | * | 11/1996 |
| JP | H11-097196 A | | 4/1999 |
| JP | H11-205239 A | | 7/1999 |
| JP | 2004-301965 A | | 10/2004 |
| WO | 2014/038239 A1 | | 3/2014 |
| WO | 2017/104075 A1 | | 6/2017 |

* cited by examiner

OPTICAL TRANSMITTER

TECHNICAL FIELD

The present disclosure relates to an optical transmitter. Priority is claimed on Japanese Patent Application No. 2020-056207 filed on Mar. 26, 2020, the entire contents of the Japanese Patent Application are incorporated herein by reference.

BACKGROUND ART

Patent Literature 1 discloses a technology related to a control method of light quantity in an optical communication device. The optical communication device described in the literature includes a light emitting element, a light quantity control means, a light receiving element, an information determination means, and a control signal generation means. The light emitting element generates an optical signal. The light quantity control means controls a transmitted light quantity of the light emitting element. The light receiving element receives an optical signal from a communications partner. The information determination means decodes the optical signal from the communications partner and determines information regarding a light quantity sent from the communications partner. The control signal generation means generates a control signal for controlling the light quantity control means on the basis of the determined information regarding the light quantity.

CITATION LIST

Patent Literature

[Patent Literature 1] Japanese Unexamined Patent Publication No. H11-205239

SUMMARY OF INVENTION

An optical transmitter according to one embodiment includes an optical transmission unit, a drive unit, an arithmetic circuit, and a bias supply circuit. The optical transmission unit includes a laser element. The drive unit drives the laser element according to a first transmission signal. The arithmetic circuit generates a second transmission signal. The bias supply circuit superimposes the second transmission signal on a bias current of the laser element. An output of the arithmetic circuit containing the second transmission signal is a digital signal in a rectangular wave form based on a reference clock having a frequency lower than a reference clock frequency of the first transmission signal. The bias supply circuit includes a circuit element for inclining a rising portion and a falling portion of the output of the arithmetic circuit.

BRIEF DESCRIPTION OF DRAWINGS

FIG. 13 shows results according to a comparative example in a case in which the shaping block of the first embodiment is not provided.

FIG. 14 shows results when the rising portion and the falling portion of the low-frequency signal have a sine-wave form.

FIG. 15 shows results when the rising portion and the falling portion of the low-frequency signal are linear.

DESCRIPTION OF EMBODIMENTS

Technical Problem

Figure 1:
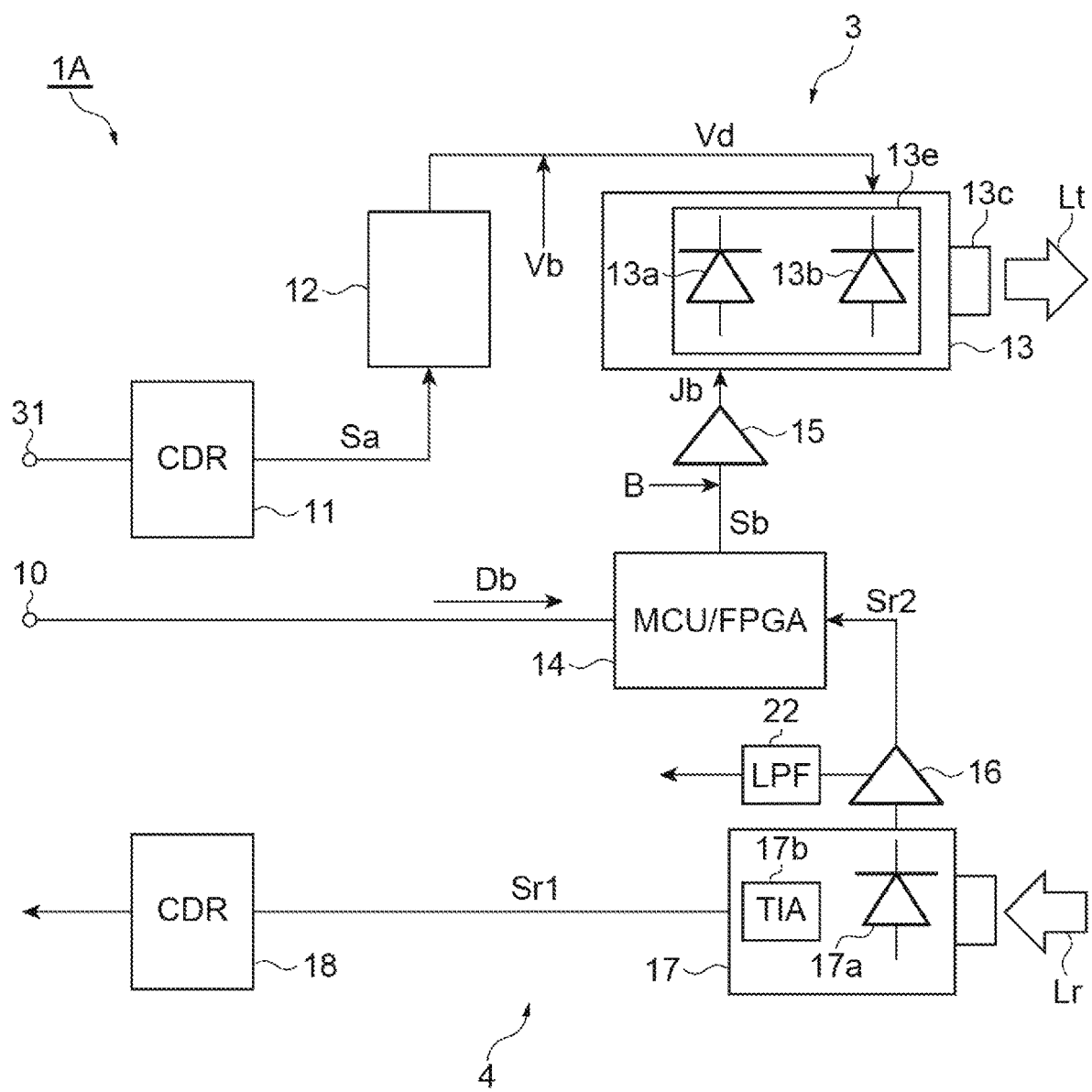
FIG. 1 is a block diagram schematically showing a configuration of an optical transceiver according to a first embodiment of the present disclosure.

Problems to be Solved by the Present Disclosure

In recent years, in optical communication systems, a technology in which a low-frequency optical signal (hereinafter referred to as an optical sub-signal) containing information used for controlling an optical communication device itself or the like is superimposed on a high-frequency optical signal (hereinafter referred to as an optical main signal) mainly containing information to be communicated is used. For example, in order for a main base station to manage a large number of wireless communication base stations, the optical sub-signal for managing the wireless communication base station is superimposed on the optical main signal transmitted and received between the wireless communication base station and the main base station. In such a technology, a degree of deterioration in a temporal waveform of the optical main signal due to the optical sub-signal is desired to be reduced as much as possible.

Effect of the Present Disclosure

According to the present disclosure, it is possible to provide an optical transmitter in which a degree of deterioration in a temporal waveform of an optical main signal due to an optical sub-signal can be reduced.

Description of Embodiments of the Present Disclosure

First, an embodiment of the present disclosure will be listed and described. An optical transmitter according to one embodiment includes an optical transmission unit, a drive unit, an arithmetic circuit, and a bias supply circuit. The optical transmission unit includes a laser element. The drive unit drives the laser element according to a first transmission signal. The arithmetic circuit generates a second transmission signal. The bias supply circuit superimposes the second transmission signal on a bias current of the laser element. An output of the arithmetic circuit containing the second transmission signal is a digital signal in a rectangular wave form based on a reference clock having a frequency lower than a reference clock frequency of the first transmission signal. The bias supply circuit includes a circuit element for inclining a rising portion and a falling portion of the output of the arithmetic circuit.

In the optical transmitter, an optical signal based on the first transmission signal corresponds to the optical main signal, and an optical signal based on the second transmission signal corresponds to the optical sub-signal. The optical sub-signal is typically represented as an envelope signal of the optical main signal. An influence of the optical sub-signal on a temporal waveform of the optical main signal is mainly due to a high frequency component contained in the optical sub-signal. That is, as a rise and fall of the optical sub-signal become steeper, high frequency components are included more in the optical sub-signal in addition to the original low frequency components. Then, if a frequency of the high frequency component is close to a frequency of the optical main signal, the frequency component acts as noise in the optical main signal. As a result, deterioration in a temporal waveform of the optical main signal is caused. On the other hand, in the optical transmitter described above, the bias supply circuit includes a circuit element for inclining the rising portion and the falling portion of the output of the arithmetic circuit containing the second transmission signal. Thereby, a frequency of the high-frequency component contained in the optical sub-signal based on the second transmission signal becomes low, and is separated from the frequency of the optical main signal. Therefore, according to the optical transmitter described above, a degree of deterioration in a temporal waveform of the optical main signal due to the optical sub-signal can be reduced.

In the above-described optical transmitter, the laser element may include a light emitting unit and a modulation unit. Then, the first transmission signal may drive the modulation unit. Alternatively, in the above-described optical transmitter, the laser element may be of a direct modulation type. Then, the first transmission signal may be input to the laser element as a direct modulation signal.

In the above-described optical transmitter, a temporal waveform of the second transmission signal output from the circuit element may be a triangular wave. Alternatively, a rising portion and a falling portion of a temporal waveform of the second transmission signal output from the circuit element may have a sine-wave form. Alternatively, a rising portion and a falling portion of a temporal waveform of the second transmission signal output from the circuit element may have a delay. For example, in such a case, a frequency of the high-frequency component contained in the optical sub-signal based on the second transmission signal becomes low. Therefore, a degree of deterioration in a temporal waveform of the optical main signal due to the optical sub-signal can be effectively reduced. When a temporal waveform of the second transmission signal is a triangular wave, a temporal waveform thereof contains a flat portion on either one or both of a top portion and a bottom portion of the triangular wave. When the rising portion and the falling portion of the temporal waveform of the second transmission signal have a sine-wave form or have a delay, a flat portion may or may not be present between the rising portion and the falling portion.

In the above-described optical transmitter, the bias supply circuit may include an n-th delay circuit and a current generation circuit. The n-th delay circuit is the above-described circuit element and gives an n-th delay to the second transmission signal. In this regard, n is an integer of 1 or more. The current generation circuit superimposes the second transmission signal that has passed through the n-th delay circuit on the bias current. In this case, the n-th delay circuit can act on the second transmission signal input to the current generation circuit to incline the rising portion and the falling portion of the second transmission signal. In this case, the n-th delay circuit may include a capacitor. One electrode of the capacitor is electrically connected to a signal path of the second transmission signal. The other electrode of the capacitor is electrically connected to a reference potential line. For example, with such a configuration, a primary delay circuit as the n-th delay circuit having the above-described operation can be realized.

In each optical transmitter described above, the bias supply circuit may include an integrating circuit and a current generation circuit. The integrating circuit is the above-described circuit element and time-integrates the second transmission signal. The current generation circuit superimposes the second transmission signal which has passed through the integrating circuit on the bias current. In this case, the integrating circuit acts on the second transmission signal input to the current generation circuit. Therefore, the rising portion and the falling portion of the second transmission signal can be inclined.

The optical transmitter described above may be utilized in an optical transmission system in which a light intensity in a transmission path from an input end to an output end is 6 dBm or less. The optical transmitter described above is particularly effective in an optical transmission system in which a maximum light intensity in the transmission path is relatively small as described above, in other words, the optical transmission path is short.

Details of Embodiments of the Present Disclosure

Specific examples of an optical transmitter of the present disclosure will be described below with reference to the drawings. The present invention is not limited to these examples but is indicated by the scope of the claims, and is intended to include all modified examples within the meaning and scope equivalent to the scope of claims. In the following description, the same elements will be denoted by the same reference signs in the description of the drawings, and duplicate description thereof will be omitted.

First Embodiment

FIG. 1 is a block diagram schematically showing a configuration of an optical transceiver 1A according to a first embodiment of the present disclosure. As shown in FIG. 1, the optical transceiver 1A of the present embodiment includes an optical transmitter 3, an optical receiver 4, and an arithmetic processing circuit 14. The optical transceiver 1A is connected to another optical transceiver 1A having the same configuration via an optical transmission path such as an optical fiber, and performs transmission and reception of signal light between itself and another optical transceiver 1A. Specifically, signal light Lt transmitted from the optical transmitter 3 of the optical transceiver 1A is received by an optical receiver 4 of another optical transceiver 1A. Signal light Lr transmitted from an optical transmitter 3 of another optical transceiver 1A is received by the optical receiver 4 of the optical transceiver 1A. The optical transceiver 1A is utilized in a relatively short distance optical transmission system such as, for example, when a light intensity in a transmission path is 6 dBm or less. The "in a transmission path" refers to a range of a transmission path from an input end to an output end.

The optical transmitter 3 includes a clock data recovery (CDR) circuit 11, a drive circuit (drive unit) 12, an optical transmission module (optical transmission unit) 13, and a bias supply circuit 15. The optical transmission module 13 includes a laser element 13e. The laser element 13e includes a light emitting unit 13a and a modulation unit 13b. The light emitting unit 13a is, for example, a laser diode, and in one example, it is, for example, a distributed feedback (DFB) laser diode. The modulation unit 13b is, for example, an electro absorption (EA) type optical modulator. When the light emitting unit 13a is a laser diode, the light emitting unit 13a includes an active layer extending in a laser resonance direction along a surface of a semiconductor substrate and a pair of clad layers provided on upper and lower sides of the active layer. Further, the light emitting unit 13a includes an anode electrode and a cathode electrode for receiving a bias current Jb. When the modulation unit 13b is of an EA type optical modulator, the modulation unit 13b has an optical waveguide layer and a pair of clad layers provided on upper and lower sides of the optical waveguide layer. Further, the modulation unit 13b has an anode electrode and a cathode electrode for receiving a drive voltage (modulation voltage) Vd. The light emitting unit 13a and the modulation unit 13b are monolithically integrated on a common semiconductor substrate to be integrated into one chip as an electro-absorption modulator integrated laser-diode (EML). The active layer of the light emitting unit 13a and the optical waveguide layer of the modulation unit 13b are optically coupled to each other using a butt joint technology or the like. One of the anode electrode and the cathode electrode may be common to the light emitting unit 13a and the modulation unit 13b. Light output from the light emitting unit 13a is output from an optical output port 13c of the optical transmission module 13 after a light intensity thereof is modulated by the modulation unit 13b. The light emitting unit 13a and the modulation unit 13b may be configured as separate elements.

An input end of the CDR circuit 11 of the optical transmitter 3 is electrically connected to an input terminal 31 of the optical transmitter 3. The input terminal 31 is connected to a host board (not shown) and receives a high-frequency signal Sa output from the host board. The high-frequency signal Sa is a digital signal (serial signal) generated at a high-frequency reference clock frequency. In the optical transceiver 1A, the high-frequency signal Sa contains main information (data) transmitted to the optical transceiver 1A on an opposite side. The CDR circuit 11 outputs a digital signal obtained by shaping the high-frequency signal Sa on the basis of a predetermined timing.

An input end of the drive circuit 12 is electrically connected to an output end of the CDR circuit 11. An output end of the drive circuit 12 is electrically connected to the anode electrode or the cathode electrode of the modulation unit 13b. The drive circuit 12 receives the high-frequency signal Sa (first transmission signal) from the CDR circuit 11 and supplies the drive voltage Vd formed by amplifying the high-frequency signal Sa to the modulation unit 13b to drive the modulation unit 13b. A frequency of the drive voltage Vd is, for example, 1 Gbps or higher, and is 25.78 Gbps in one example. Inside or outside the drive circuit 12, a bias voltage Vb for adjusting a magnitude of a low level of the drive voltage Vd is superimposed on the drive voltage Vd.

The arithmetic processing circuit (arithmetic circuit) 14 is electrically connected to an input/output end 10 of the optical transceiver 1A. The arithmetic processing circuit 14 receives control data db containing an I2C (Inter-Integrated Circuit) signal through the input/output end 10 from the host board (not shown). In the optical transceiver 1A, the control data db contains management information transmitted to the optical transceiver 1A on the opposite side. The management information refers to information for controlling and managing an operation of the optical transceiver 1A on this side or the optical transceiver 1A on the opposite side. The arithmetic processing circuit 14 generates a low-frequency signal Sb (second transmission signal) on the basis of the control data db and data collected by itself. The low-frequency signal Sb is a digital signal in a rectangular wave form. A reference clock frequency of the low-frequency signal Sb is sufficiently lower than a frequency of the drive voltage Vd, that is, a reference clock frequency of the high-frequency signal Sa. A frequency of the low-frequency signal Sb is, for example, 50 kHz. The arithmetic processing circuit 14 has an output end electrically connected to an input end of the bias supply circuit 15 and outputs the low-frequency signal Sb to the bias supply circuit 15. The arithmetic processing circuit 14 is a circuit for controlling an operation of the optical transceiver 1A. The arithmetic processing circuit 14 may be configured by various large-scale integrated circuits such as a memory control unit (MCU) or an FPGA (Field Programmable Gate Array). In an MCU, a computer system including a CPU, a memory, and the like is incorporated in one integrated circuit. An FPGA is an element in which connection relationships of a large number of logic circuits can be programmed.

Figure 2A:
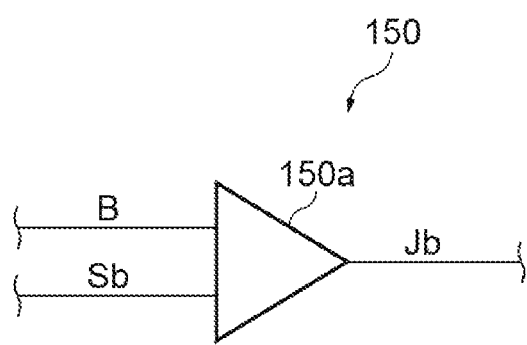
FIG. 2A is a diagram schematically showing an example of a bias supply circuit in a conventional optical transceiver.

The bias supply circuit 15 has an input end and an output end. The input end of the bias supply circuit 15 is electrically connected to the arithmetic processing circuit 14. The output end of the bias supply circuit 15 is electrically connected to the anode electrode or the cathode electrode of the light emitting unit 13a. The bias supply circuit 15 supplies a bias current Jb obtained by superimposing a direct current bias B on the low-frequency signal Sb to the light emitting unit 13a. FIG. 2A is a diagram schematically showing an example of a bias supply circuit 150 in a conventional optical transceiver. In a conventional optical transceiver, the bias supply circuit 150 includes a current conversion circuit block 150a. Then, the direct current bias B is input to one input end of the current conversion circuit block 150a, and the low-frequency signal Sb is input to another input end thereof. The current conversion circuit block 150a outputs the bias current Jb obtained by superimposing the low-frequency signal Sb and the direct current bias B from the output end.

Figure 2B:
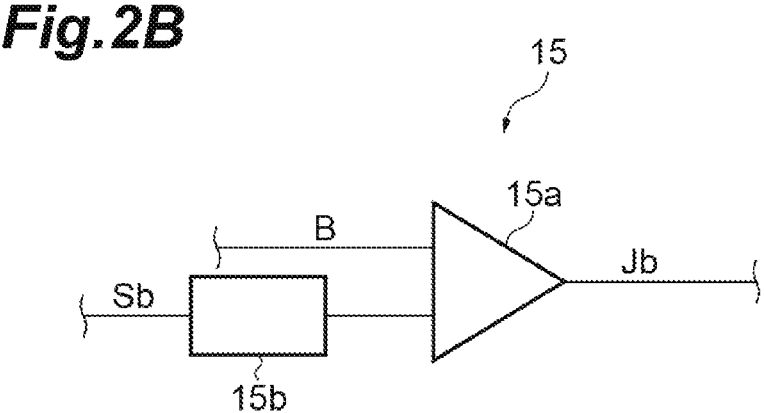
FIG. 2B is a diagram schematically showing a bias supply circuit included in the optical transceiver of the first embodiment.

On the other hand, FIG. 2B is a diagram schematically showing the bias supply circuit 15 included in the optical transceiver 1A of the present embodiment. As shown in FIG. 2B, the bias supply circuit 15 of the present embodiment includes a shaping block 15b in addition to a current conversion circuit block 15a. The shaping block 15b is a circuit element for inclining a rising portion and a falling portion of a temporal waveform of the low-frequency signal Sb output from the arithmetic processing circuit 14. The shaping block 15b has an input end and an output end. The input end of the shaping block 15b inputs the low-frequency signal Sb from the arithmetic processing circuit 14. The output end of the shaping block 15b is electrically connected to another input end of the current conversion circuit block 15a. The shaping block 15b inclines the rising portion and falling portion of the temporal waveform of the low-frequency signal Sb input from the arithmetic processing circuit 14, and then outputs the low-frequency signal Sb from the output end to the current conversion circuit block 15a. The current conversion circuit block 15a outputs the bias current Jb formed by superimposing the low-frequency signal Sb and the direct current bias B from the output end.

Figure 3:
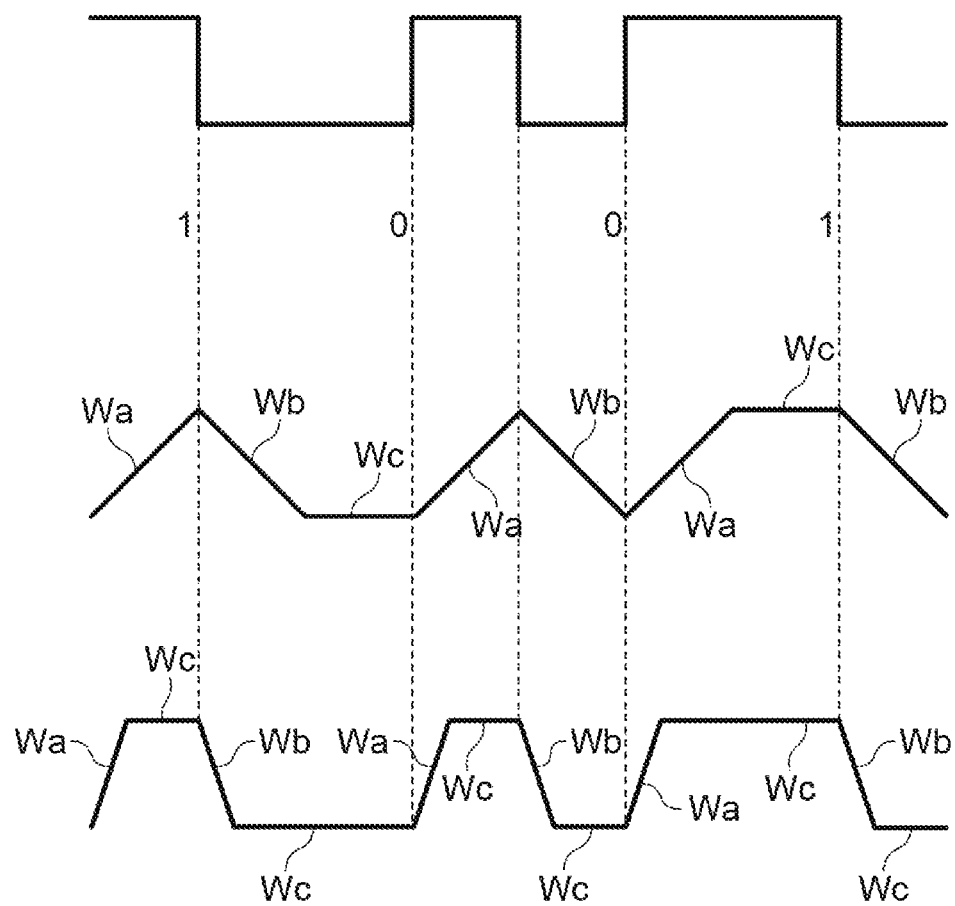
FIG. 3 is a diagram showing an example of a temporal waveform of a low-frequency signal output from a shaping block. An upper part of FIG. 3 shows an example of a rectangular-wave-formed temporal waveform of the low-frequency signal before it is input to the shaping block. Middle and lower parts of FIG. 3 show examples of a temporal waveform of the low-frequency signal, corresponding to the low-frequency signal shown in the upper part, output from the shaping block.
Figure 4:
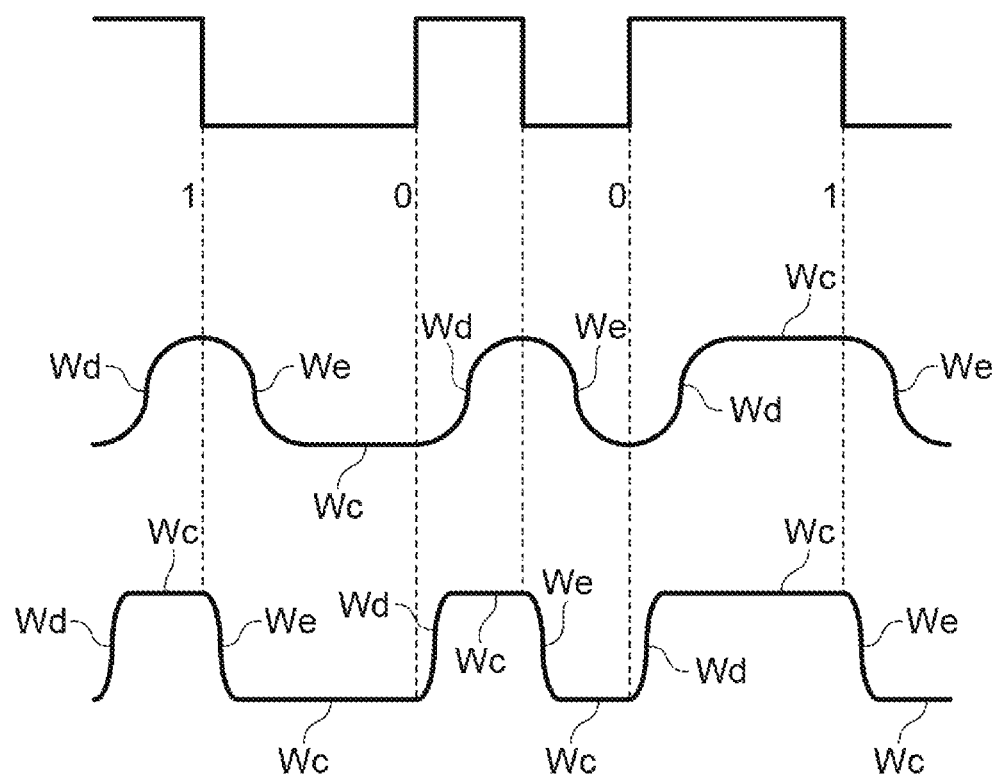
FIG. 4 is a diagram showing an example of a temporal waveform of the low-frequency signal output from the shaping block. An upper part of FIG. 4 shows an example of a rectangular-wave-formed temporal waveform of the low-frequency signal before it is input to the shaping block. Middle and lower parts of FIG. 4 show examples of a temporal waveform of the low-frequency signal, corresponding to the low-frequency signal shown in the upper part, output from the shaping block.
Figure 5:
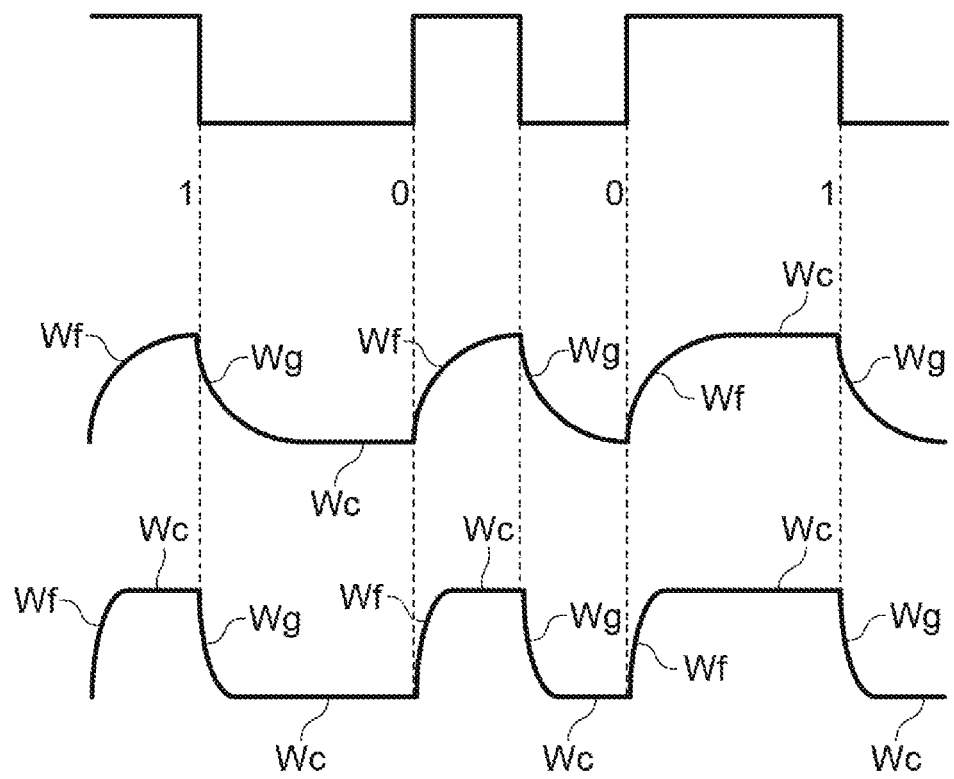
FIG. 5 is a diagram showing an example of a temporal waveform of the low-frequency signal output from the shaping block. An upper part of FIG. 5 shows an example of a rectangular-wave-formed temporal waveform of the low-frequency signal before it is input to the shaping block. Middle and lower parts of FIG. 5 show examples of a temporal waveform of the low-frequency signal, corresponding to the low-frequency signal shown in the upper part, output from the shaping block.

FIGS. 3, 4, and 5 are diagrams showing examples of a temporal waveform of the low-frequency signal Sb output from the shaping block 15b. In each of these figures, an upper part shows an example of a rectangular-wave-formed temporal waveform of the low-frequency signal Sb output from the arithmetic processing circuit 14 before it is input to the shaping block 15b. Middle and lower parts show examples of the temporal waveform of the low-frequency signal Sb, corresponding to the low-frequency signal Sb shown in the upper part, output from the shaping block 15b. As shown in the middle part of FIG. 3, the temporal waveform of the low-frequency signal Sb output from the shaping block 15b is a triangular wave, and may have a flat portion Wc for either one or both of a top portion and a bottom portion of the triangular wave. Here, the triangular wave refers to a waveform which is mainly configured by a rising portion Wa and a falling portion Wb, and in which inclinations of the rising portion Wa and the falling portion Wb are substantially constant. The flat portion of the top portion and the bottom portion refers to a portion in which a value is constant. As shown in the lower part of FIG. 3, the temporal waveform of the low-frequency signal Sb output from the shaping block 15b may have a trapezoidal shape in which the flat portion Wc always exists between the inclined rising portion Wa and falling portion Wb. The temporal waveforms shown in the middle and lower parts of FIG. 3 can be obtained by, for example, time-integrating the low-frequency signal Sb in a rectangular wave form shown in the upper part.

As shown in the middle and lower parts of FIG. 4, in the temporal waveform of the low-frequency signal Sb output from the shaping block 15b, the rising portion Wd and the falling portion We may each have a sine-wave form. In that case, as shown in the middle part of FIG. 4, the temporal waveform of the low-frequency signal Sb may include a pulse waveform in which the flat portion Wc is not present between the rising portion Wd and the falling portion We. Alternatively, as shown in the lower part of FIG. 4, the flat portion Wc may always be present between the rising portion Wd and the falling portion We. The middle part of FIG. 4 shows a case in which a period of the sine wave is relatively large. The lower part of FIG. 4 shows a case in which a period of the sine wave is relatively small.

As shown in the middle and lower parts of FIG. 5, the temporal waveform of the low-frequency signal Sb output from the shaping block 15b may be a waveform in which a rising portion Wf and a falling portion Wg each have a delay, in other words, low-pass filter processing is performed. In that case, as shown in the middle part of FIG. 5, the temporal waveform of the low-frequency signal Sb may include a pulse waveform in which the flat portion Wc is not present between the rising portion Wf and the falling portion Wg. Alternatively, as shown in the lower part of FIG. 5, the flat portion Wc may always be present between the rising portion Wf and the falling portion Wg. The temporal waveform shown in the middle and lower parts of FIG. 5 can be obtained by, for example, giving an n-th delay to the low-frequency signal Sb in a rectangular wave form shown in the upper part. n is an integer of 1 or more. The middle part shows a case in which a time constant of the n-th delay is relatively large. The lower part shows a case in which a time constant of the n-th delay is relatively small.

Figure 6:
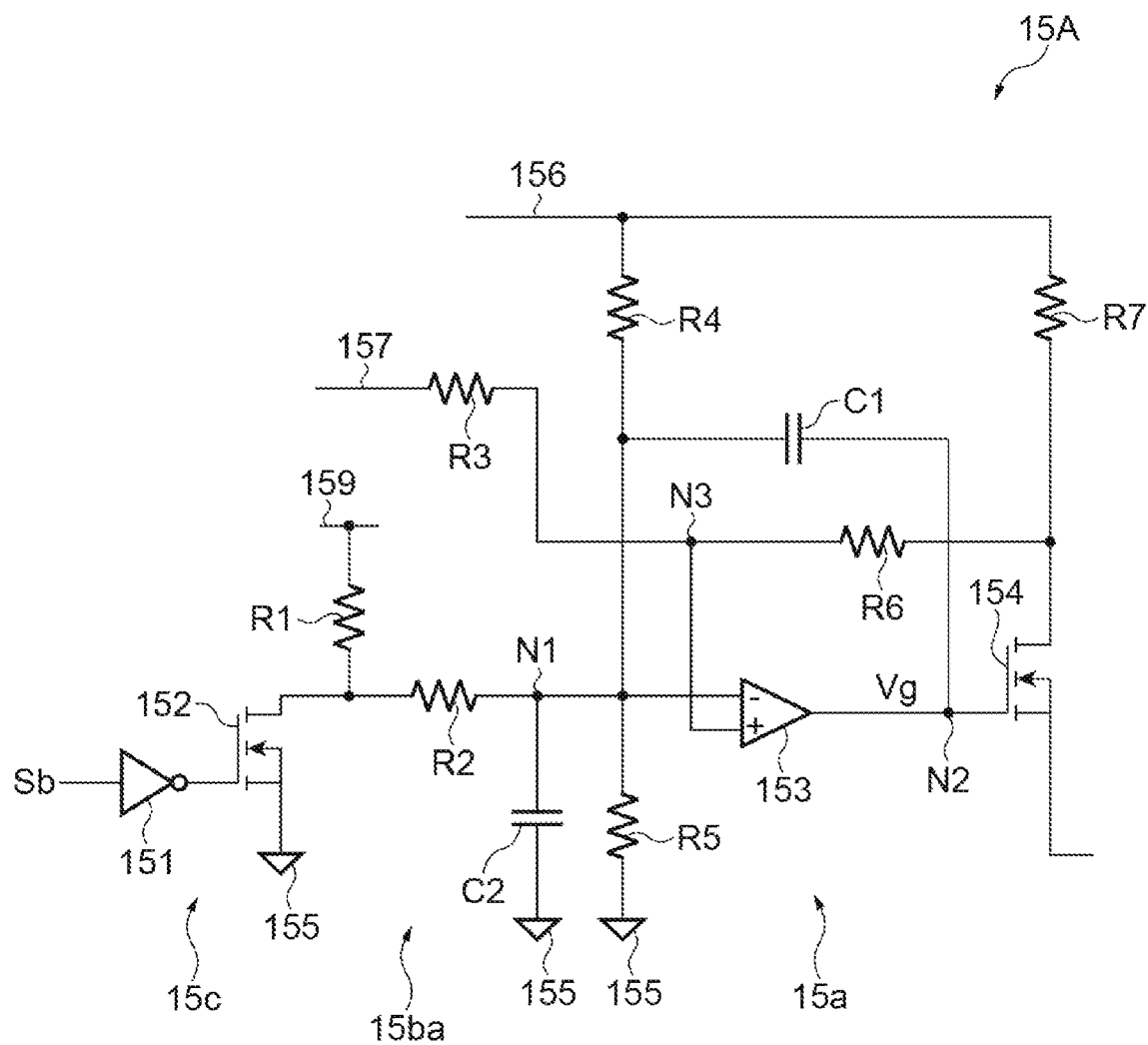
FIG. 6 is a circuit diagram showing a specific example of the bias supply circuit.

FIG. 6 is a circuit diagram showing a bias supply circuit 15A as a specific example of the bias supply circuit 15. As shown in FIG. 6, the bias supply circuit 15A includes the current conversion circuit block 15a, a shaping block 15ba, and an amplification block 15c. The amplification block 15c is a grounded-source circuit and includes a logic inversion circuit 151 and a transistor (FET) 152. The low-frequency signal Sb is input to a gate of the transistor 152 from the arithmetic processing circuit 14 via the logic inversion circuit 151. One current terminal of the transistor 152, for example a drain, is connected to a constant potential line 159 via a resistor R1. The other current terminal of the transistor 152, for example a source, is connected to a reference potential line 155. A potential of the constant potential line 159 is higher than a potential of the reference potential line 155. With such a configuration, the amplified low-frequency signal Sb is output from one current terminal of the transistor 152.

The shaping block 15ba corresponds to the shaping block 15b shown in FIG. 2B. The shaping block 15ba is connected to a subsequent stage of the amplification block 15c. In this example, the shaping block 15ba is a primary delay circuit, in other words, a low-pass filter circuit. In the illustrated example, the shaping block 15ba includes a resistor R2 and a capacitor C2. The resistor R2 is provided on a signal path extending from one current terminal of the transistor 152. One electrode of the capacitor C2 is connected to the signal path. The other electrode of the capacitor C2 is connected to the reference potential line 155. More specifically, one end of the resistor R2 is electrically connected to one current terminal of the transistor 152. The other end of the resistor R2 is electrically connected to one electrode of the capacitor C2.

The current conversion circuit block 15a includes an operational amplifier 153 and a transistor (FET) 154. An inverting input terminal of the operational amplifier 153 is connected to a node N1 between the resistor R2 and the capacitor C2 in the shaping block 15ba. Therefore, the low-frequency signal Sb that has passed through the shaping block 15ba is input to the inverting input terminal of the operational amplifier 153. The node N1 is electrically connected to a power supply potential line 156 via a resistor R4 and electrically connected to the reference potential line 155 via a resistor R5. A potential of the power supply potential line 156 is higher than the potential of the reference potential line 155. A non-inverting input terminal of the operational amplifier 153 is connected to a bias potential line 157 via a resistor R3. A potential of the bias potential line 157 is higher than the potential of the reference potential line 155. Thereby, a voltage Vg in which a bias is superimposed on the low-frequency signal Sb is generated. The resistors R3, R4, and R5 are provided to control voltage-current conversion of the current conversion circuit block 15a. Specifically, the resistors R3, R4, and R5 are provided for increasing an input impedance, controlling a magnification of voltage-current conversion determined by a resistance ratio, and adjusting an amount of current flowing through the resistor R7, when a voltage between both ends of a resistor R7 is transmitted to a control circuit side. When resistance values of the resistors R3, R4, R5, and R6 are assumed to be $R_3$, $R_4$, $R_5$, and $R_6$, the resistance values are each set to satisfy $R_4:R_5=R_6:R_3$. In this case, when one end of the resistor R5 is set as a reference potential, an amount of current of the resistor R7 can be made to 0 mA when a potential of the bias potential line 157 is the reference potential. Then, the amount of current of the resistor R7 can be adjusted by further changing a voltage of the bias potential line 157.

An output terminal of the operational amplifier 153 is electrically connected to a gate of the transistor 154. Therefore, the voltage Vg containing the low-frequency signal Sb is applied to the gate of the transistor 154. A node N2 between the output terminal of the operational amplifier 153 and the gate of the transistor 154 is electrically connected to the inverting input terminal of the operational amplifier 153 via a capacitor C1 as a coupling capacitor. The capacitor C1 is provided for response suppression of the operational amplifier 153, that is, for avoiding a response faster than necessary. Although an optical transceiver has a Tx Disable function and it is necessary to quickly return light to an ON state when the Disable is removed, if the returning is too fast, too much current will flow and excessive light emission will occur, and therefore the capacitor C1 is provided to suppress this. One current terminal of the transistor 154, for example a drain, is connected to the power supply potential line 156 via the resistor R7. Further, one current terminal of the transistor 154 is connected to a node N3 via the resistor R6. The node N3 is a node between the non-inverting input terminal of the operational amplifier 153 and the resistor R3. The other current terminal of the transistor 154, for example a source, is electrically connected to the light emitting unit 13a (see FIG. 1) of the optical transmission module 13.

In the bias supply circuit 15A shown in FIG. 6, a current of an amount corresponding to a gate voltage of the transistor 154 is supplied from the power supply potential line 156 to the light emitting unit 13a. The voltage Vg containing the low-frequency signal Sb that has passed through the shaping block 15ba serving as a primary delay circuit is input to the gate of the transistor 154. Therefore, the rising portion and the falling portion of the low-frequency signal Sb are inclined by the shaping block 15ba serving as a primary delay circuit (see the middle and lower parts of FIG. 5). A degree of inclination is determined according to a product of a resistance value of the resistor R2 and a capacitance value of the capacitor C2, that is, a time constant.

Figure 7:
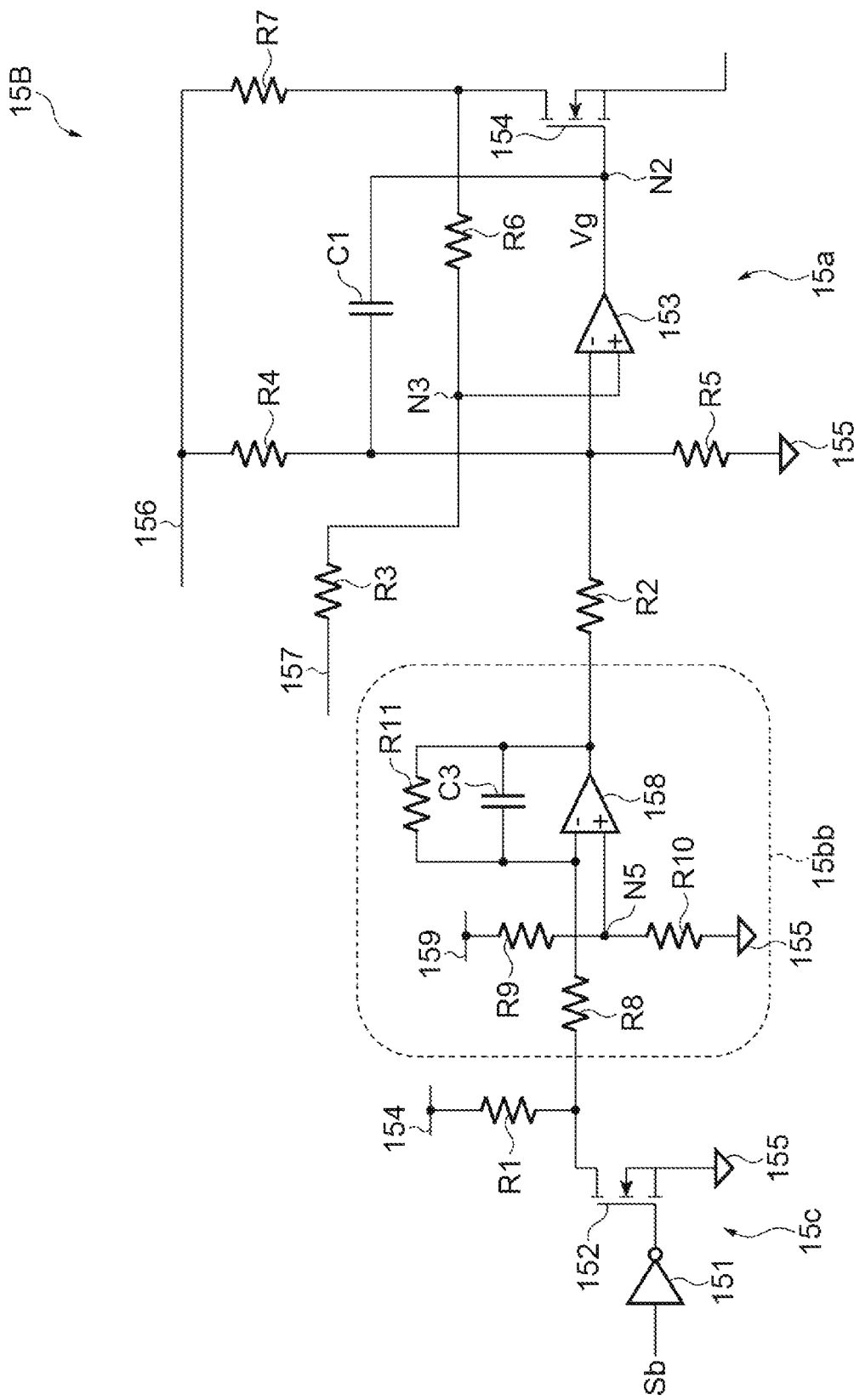
FIG. 7 is a circuit diagram showing another specific example of the bias supply circuit.

FIG. 7 is a circuit diagram showing a bias supply circuit 15B as another specific example of the bias supply circuit 15. As shown in FIG. 7, the bias supply circuit 15B includes the current conversion circuit block 15a, a shaping block 15bb, and the amplification block 15c. Of these, since configurations of the current conversion circuit block 15a and the amplification block 15c are the same as those in FIG. 6, description thereof will be omitted. The shaping block 15bb corresponds to the shaping block 15b shown in FIG. 2B. The shaping block 15bb is connected to a subsequent stage of the amplification block 15c. In this example, the shaping block 15bb is an integrating circuit. In the illustrated example, the shaping block 15bb includes a resistor R8 and an operational amplifier 158. The resistor R8 is provided on a signal path extending from one current terminal of the transistor 152. An inverting input terminal of the operational amplifier 158 is connected to the signal path. A non-inverting input terminal of the operational amplifier 158 is connected to a node N5 between a resistor R9 and a resistor R10. The resistor R9 and the resistor R10 are connected in series between the constant potential line 159 and the reference potential line 155, and divide a voltage between the constant potential line 159 and the reference potential line 155. The voltage divided by the resistor R9 and the resistor R10 is input to the non-inverting input terminal of the operational amplifier 158. A resistor R11 and a capacitor C3 are connected in parallel with each other between an output terminal and the inverting input terminal of the operational amplifier 158. The output terminal of the operational amplifier 158 is electrically connected to the inverting input terminal of the operational amplifier 153 of the current conversion circuit block 15a via the resistor R2.

Also in the bias supply circuit 15B shown in FIG. 7, a current of an amount corresponding to the gate voltage of the transistor 154 is supplied from the power supply potential line 156 to the light emitting unit 13a. The voltage Vg containing the low-frequency signal Sb that has passed through the shaping block 15bb serving as an integrating circuit is input to the gate of the transistor 154. Therefore, the rising portion and the falling portion of the low-frequency signal Sb are inclined by the shaping block 15bb serving as an integrating circuit (see the middle and lower parts of FIG. 3). A degree of inclination is mainly determined according to a capacitance value of the capacitor C3.

Figure 8:
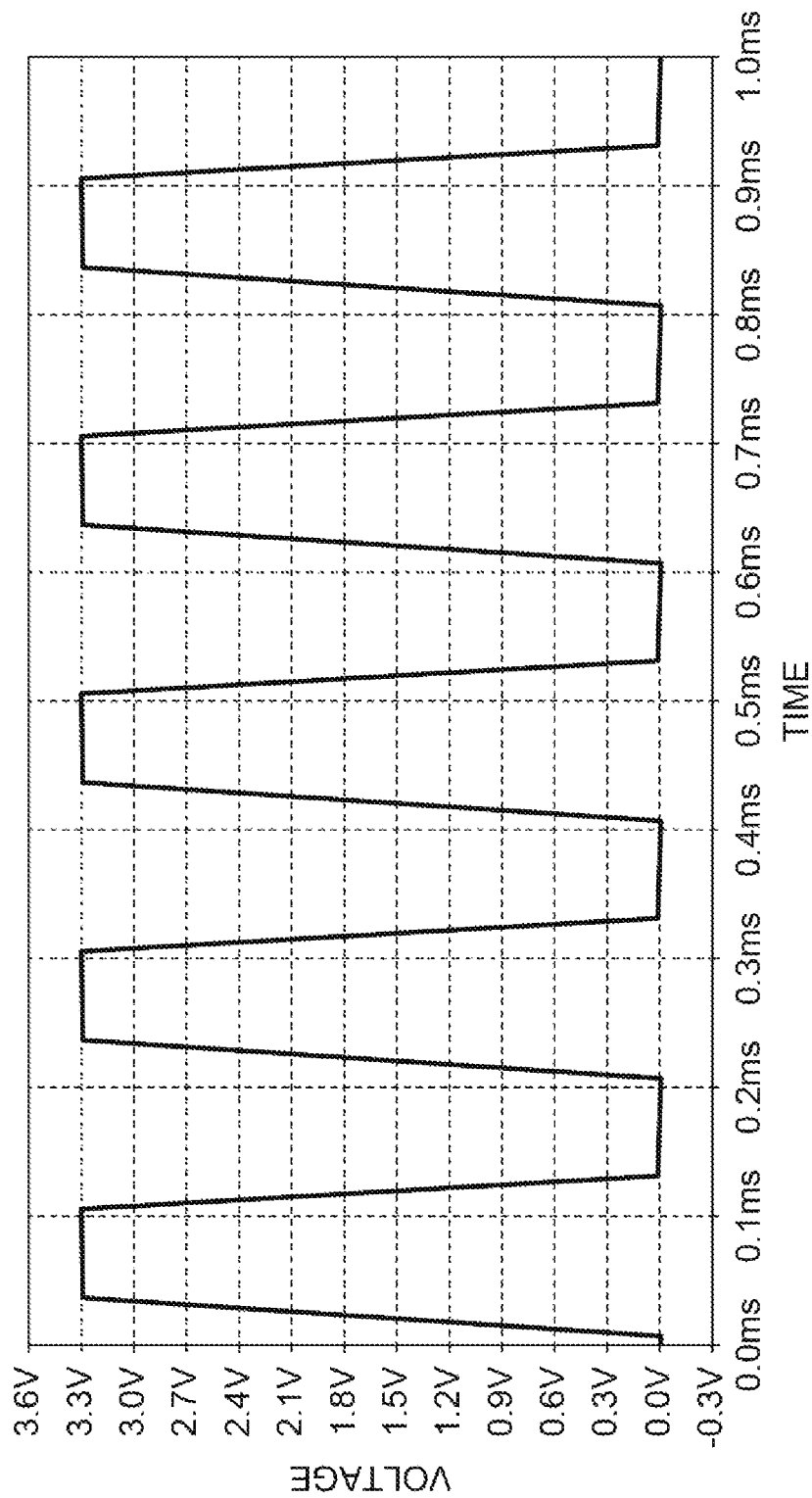
FIG. 8 is a graph showing an example of a signal waveform output from an integrating circuit shown in FIG. 7.
Figure 9:
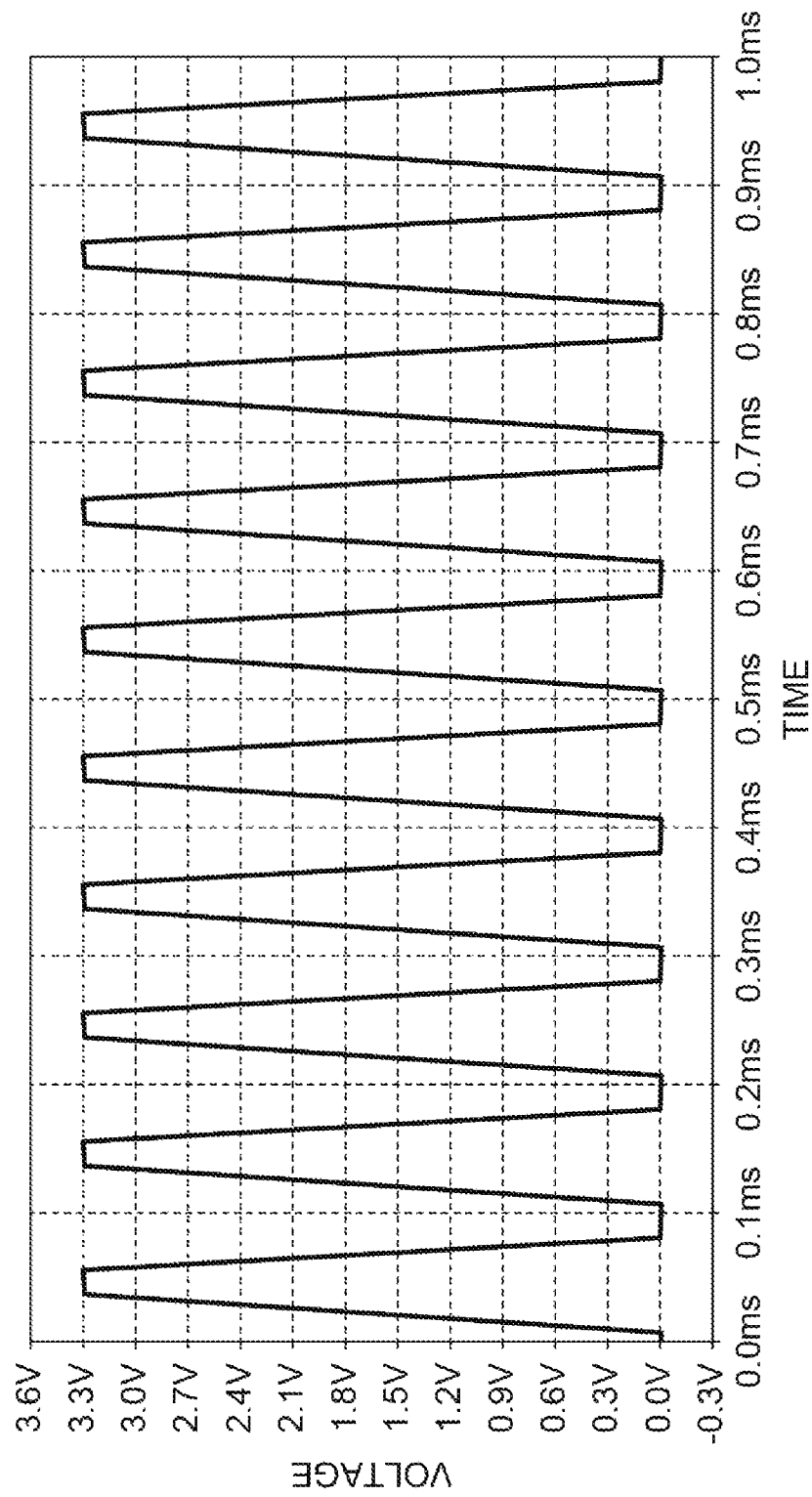
FIG. 9 is a graph showing another example of a signal waveform output from the integrating circuit shown in FIG. 7.

FIGS. 8 and 9 are graphs showing examples of a signal waveform output from the shaping block 15bb serving as the integrating circuit shown in FIG. 7. In these figures, the vertical axis represents a voltage and the horizontal axis represents a time. A unit of the vertical axis is volt. A unit of the horizontal axis is milliseconds. FIG. 8 shows a case in which a frequency of the low-frequency signal Sb is 10 kHz. FIG. 9 shows a case in which a frequency of the low-frequency signal Sb is 5 kHz. As shown in these figures, the rise and fall of the low-frequency signal Sb in the temporal waveform are linearly inclined by the shaping block 15bb serving as an integrating circuit. If a capacitance value of the capacitor C2 in the shaping block 15bb serving as an integrating circuit is the same, a degree of inclination, that is, the inclination also is almost the same regardless of the frequency of the low-frequency signal Sb.

FIG. 1 is referred to again. The optical receiver 4 includes a low-frequency signal amplification unit 16, a light receiving module (light receiving unit) 17, and a CDR circuit 18. The light receiving module 17 receives received light Lr which is an optical signal transmitted from the optical transceiver 1A on the opposite side. The received light Lr is formed by superimposing an optical signal based on the high-frequency signal Sa and an optical signal based on the low-frequency signal Sb. The light receiving module 17 includes a light receiving element 17a and a transimpedance amplifier (TIA) 17b. The light receiving element 17a is, for example, a photodiode. The light receiving element 17a receives the received light Lr and converts the received light Lr into a current signal. One terminal of the light receiving element 17a, for example, an anode, is electrically connected to an input end of the TIA 17b. The TIA 17b converts a frequency component of LFC (Low-frequency Cut-off) or higher in the current signal output from the light receiving element 17a, that is, a frequency component including the high-frequency signal Sa, into a voltage signal. The voltage signal is output from the TIA 17b as a received signal Sr1 including the high-frequency signal Sa. The CDR circuit 18 is electrically connected to an output end of the TIA 17b. The CDR circuit 18 separates a clock from the received signal Sr1 output from the TIA 17b to extract received data.

One or the other terminal of the light receiving element 17a, for example, a cathode, is electrically connected to an input end of the low-frequency signal amplification unit 16. One or the other terminal of the light receiving element 17a being electrically connected to the input end of the low-frequency signal amplification unit 16 is a concept also including, for example, the following aspects. That is, when the other terminal of the light receiving element 17a is led out to the outside of the light receiving module 17, a circuit for detecting a current from the light receiving element 17a is provided outside the light receiving module 17, for example, on a control board of the optical transceiver 1A. A case in which the other terminal of the light receiving element 17a is led out to the outside of the light receiving module 17 is, for example, a case in which the light receiving element 17a is an APD. The circuit for detecting a current from the light receiving element 17a is, for example, a current mirror circuit. Then, an output of the detection circuit is connected to the input end of the low-frequency signal amplification unit 16. Alternatively, when the circuit for detecting a current from the light receiving element 17a is provided inside the TIA 17b, a current detection signal output from the TIA 17b is provided to the input end of the low-frequency signal amplification unit 16. A case in which the circuit for detecting a current from the light receiving element 17a is provided inside the TIA 17b is, for example, a case in which the light receiving element 17a is a PIN photodiode. The current detection signal output from the TIA 17b is usually RSSI (Received Signal Strength Indicator).

The low-frequency signal amplification unit 16 converts the current signal output from the light receiving element 17a into a voltage signal. At this time, the current signal input to the low-frequency signal amplification unit 16 mainly contains a frequency component of a predetermined frequency or less, that is, a frequency component including the low-frequency signal Sb. The voltage signal is output from the low-frequency signal amplification unit 16 as a received signal Sr2 including the low-frequency signal Sb. A current signal output from the other terminal of the light receiving element 17a can also be used for monitoring a light intensity of the received light Lr. An output end of the low-frequency signal amplification unit 16 is electrically connected to the arithmetic processing circuit 14. The arithmetic processing circuit 14 receives the received signal Sr2 from the low-frequency signal amplification unit 16 and changes a bias current of the direct current bias B to an appropriate value.

Figure 10:
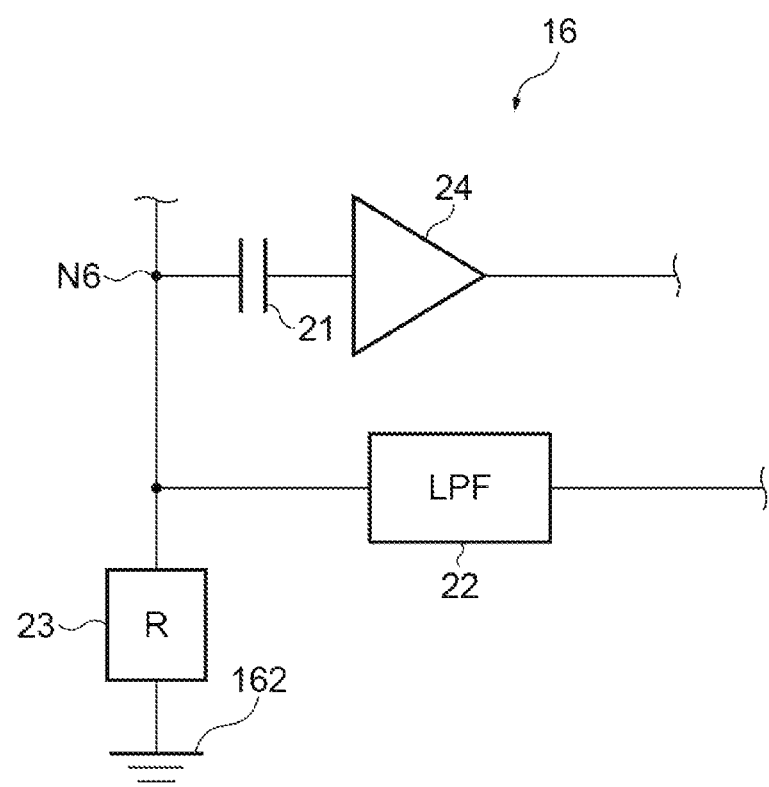
FIG. 10 is a diagram schematically showing a low-frequency signal amplification unit and a peripheral circuit thereof included in the optical transceiver of the first embodiment.

FIG. 10 is a diagram schematically showing the low-frequency signal amplification unit 16 and a peripheral circuit thereof included in the optical transceiver 1A of the present embodiment. As shown in FIG. 10, the low-frequency signal amplification unit 16 of the present embodiment includes a capacitor 21, a resistor 23, and an amplifier circuit 24. The resistor 23 is connected between the other terminal of the light receiving element 17a and a reference potential line 162, and converts the current signal output from the light receiving element 17a into a voltage signal, that is, a received signal containing the low-frequency signal Sb. A node N6 between the other terminal of the light receiving element 17a and the resistor 23 is connected to an input end of the amplifier circuit 24 via the capacitor 21 as a coupling capacitor. The capacitor 21 allows a component of a voltage signal having a certain frequency or higher to pass therethrough and blocks a component lower than that frequency. The frequency is set lower than the frequency of the low-frequency signal Sb. Therefore, the low-frequency signal Sb passes through the capacitor 21 and is input to the amplifier circuit 24. The amplifier circuit 24 amplifies the low-frequency signal Sb and outputs it to the arithmetic processing circuit 14. The arithmetic processing circuit 14 inputs the low-frequency signal Sb to a comparator and discriminates between a high level and a low level.

The node N6 is connected to an input end of a low-pass filter circuit 22. The low-pass filter circuit 22 allows a component of a certain frequency or lower to pass therethrough and blocks a component higher than that frequency. This frequency is set lower than the frequency of the low-frequency signal Sb. Therefore, the low-frequency signal Sb is blocked by the low-pass filter circuit 22. Only a direct current bias component contained in the voltage signal passes through the low-pass filter circuit 22 and is output to a light intensity monitor circuit (not shown).

Figure 11:
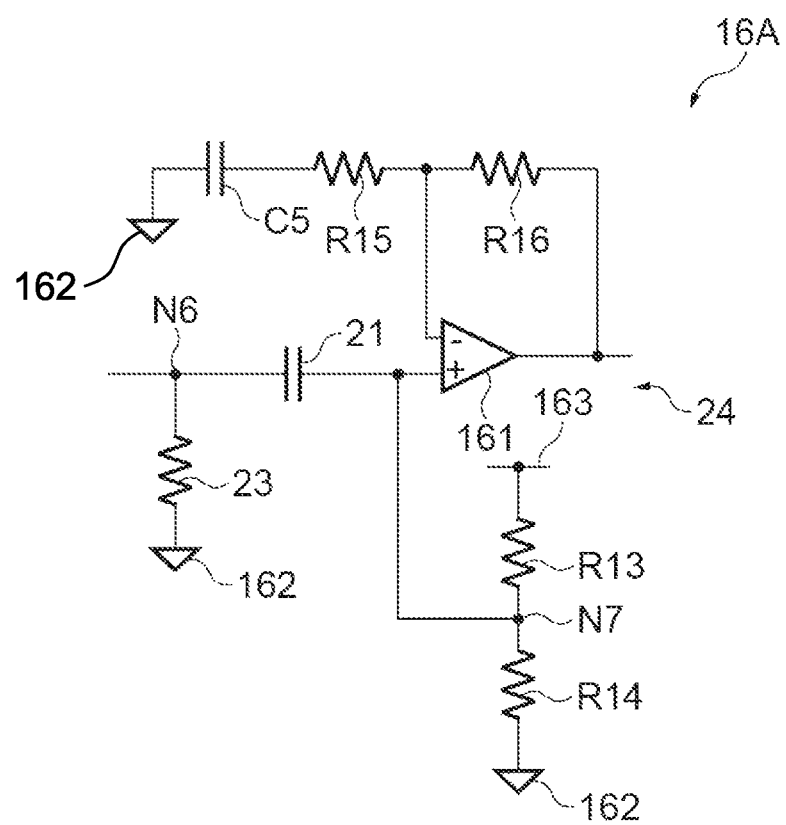
FIG. 11 is a circuit diagram showing a specific example of a configuration of an amplifier circuit of the low-frequency signal amplification unit.

FIG. 11 is a circuit diagram showing a low-frequency signal amplification unit 16A as a specific example of a configuration of the low-frequency signal amplification unit 16. As shown in FIG. 11, the low-frequency signal amplification unit 16A includes an operational amplifier 161 as the amplifier circuit 24. The non-inverting input terminal of the operational amplifier 161 is electrically connected to the node N6 via the capacitor 21. In addition, the non-inverting input terminal of the operational amplifier 161 is connected to a node N7 between a resistor R13 and a resistor R14. The resistor R13 and the resistor R14 are connected in series between a constant potential line 163 and the reference potential line 162, and divide a voltage between the constant potential line 163 and the reference potential line 162. The divided voltage is superimposed on the low-frequency signal Sb and input to the non-inverting input terminal of the operational amplifier 161. An inverting input terminal of the operational amplifier 161 is electrically connected to an output terminal of the operational amplifier 161 via a resistor R16. In addition, the inverting input terminal of the operational amplifier 161 is electrically connected to the reference potential line 162 via a series circuit of a resistor R15 and a capacitor C5. The resistor R16 determines a gain of the low-frequency signal amplification unit 16A. The gain of the low-frequency signal amplification unit 16A is, for example, 900 times or more.

Figure 12:
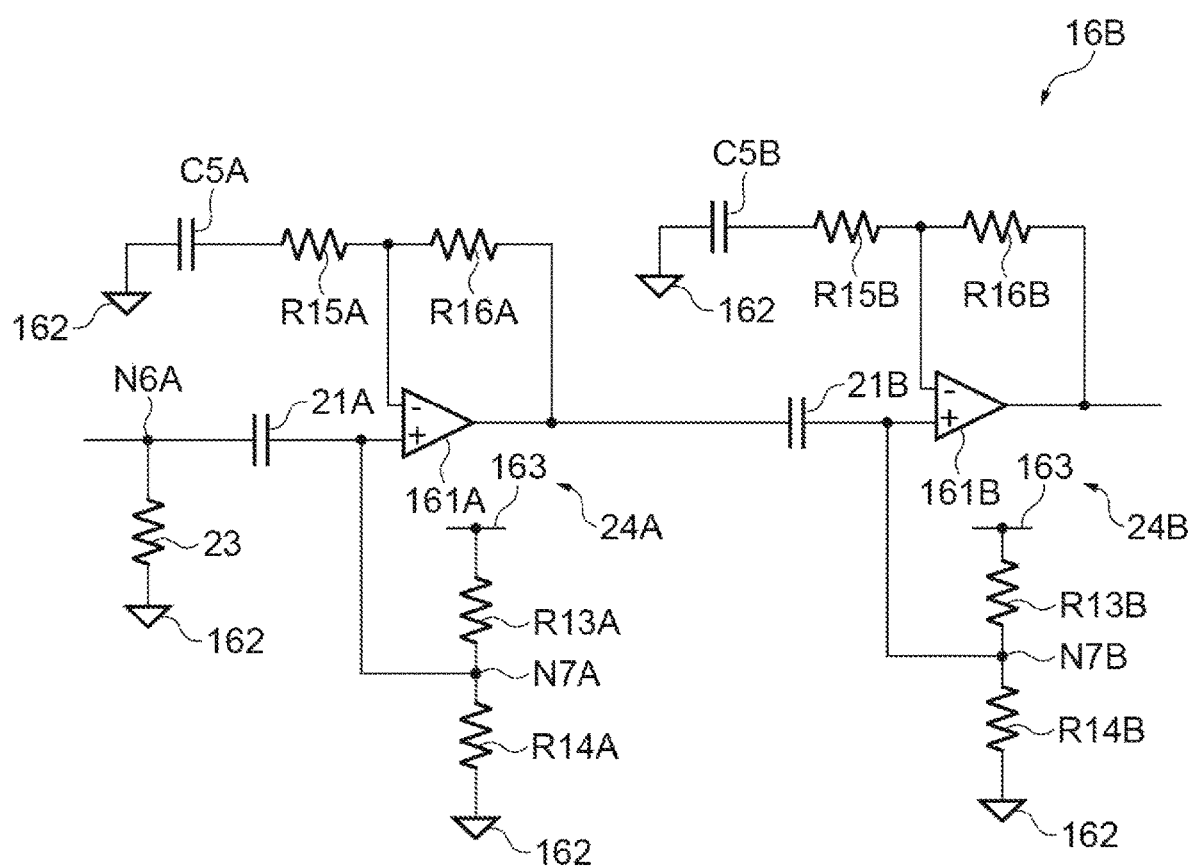
FIG. 12 is a circuit diagram showing another specific example of the configuration of the amplifier circuit of the low-frequency signal amplification unit.

FIG. 12 is a circuit diagram showing a low-frequency signal amplification unit 16B as another specific example of the configuration of the amplifier circuit of the low-frequency signal amplification unit 16. As shown in FIG. 12, the amplifier circuit 24 shown in FIG. 11 is formed in two stages in the low-frequency signal amplification unit 16B. Specifically, the low-frequency signal amplification unit 16B includes amplifier circuits 24A and 24B. The amplifier circuit 24A includes an operational amplifier 161A. A non-inverting input terminal of the operational amplifier 161A is electrically connected to a node N6A via a capacitor 21A. In addition, the non-inverting input terminal of the operational amplifier 161A is connected to a node N7A between a resistor R13A and a resistor R14A. The resistor R13A and the resistor R14A are connected in series between the constant potential line 163 and the reference potential line 162, and divide a voltage between the constant potential line 163 and the reference potential line 162. The divided voltage is superimposed on the low-frequency signal Sb and input to the non-inverting input terminal of the operational amplifier 161A. An inverting input terminal of the operational amplifier 161A is electrically connected to an output terminal of the operational amplifier 161A via a resistor R16A. In addition, the inverting input terminal of the operational amplifier 161A is electrically connected to the reference potential line 162 via a series circuit of a resistor R15A and a capacitor C5A. The resistor R16A determines a gain of the amplifier circuit 24A. The amplifier circuit 24B includes an operational amplifier 161B. A non-inverting input terminal of the operational amplifier 161B is electrically connected to an output terminal of the operational amplifier 161A via a capacitor 21B. The non-inverting input terminal of the operational amplifier 161B is connected to a node N7B between a resistor R13B and a resistor R14B. The resistor R13B and the resistor R14B are connected in series between the constant potential line 163 and the reference potential line 162, and divide a voltage between the constant potential line 163 and the reference potential line 162. The divided voltage is superimposed on an output signal from the amplifier circuit 24A and input to the non-inverting input terminal of the operational amplifier 161B. An inverting input terminal of the operational amplifier 161B is electrically connected to an output terminal of the operational amplifier 161B via a resistor R16B. In addition, the inverting input terminal of the operational amplifier 161B is electrically connected to the reference potential line 162 via a series circuit of a resistor R15B and a capacitor C5B. The resistor R16B determines a gain of the amplifier circuit 24B.

The gain of the low-frequency signal amplification unit 16B shown in FIG. 12 is, for example, 900 times. The gains of the two-stage amplifier circuits 24A and 24B constituting the low-frequency signal amplification unit 16B may be equal to each other. In that case, if the gain required for the low-frequency signal amplification unit 16B is 900 times, the gains of the amplifier circuits 24A and 24B are each set to 30 times.

Effects that can be obtained by the optical transmitter 3 and the optical receiver 4 of the present embodiment having the configuration described above will be described together with conventional problems. In optical communication systems, a technology of superimposing an optical sub-signal on an optical main signal is used. The optical main signal is a high-frequency optical signal that mainly contains information to be communicated. The optical sub-signal is a low-frequency optical signal that contains information used for controlling an optical communication device itself or the like. For example, in recent years, with an increase in wireless communication capacity due to mobile communication terminals such as smartphones, IOT (Internet of Things), and the like, a large number of wireless communication base stations are required. In order to efficiently increase the number of wireless base stations, a centralized radio access network called C-RAN (Centralized Radio Access Network) has been established. In a case of C-RAN, wireless base stations are each equipped with only a receiving device. Then, control of the wireless base stations and connection to a wide area optical network are intensively performed by a main base station. Due to an increase in wireless communication capacity in recent years, the wireless base stations are generally connected to the main base station by an optical communication system.

As a method for a main base station to manage wireless base stations, a message channel defined in G698.4 can be exemplified. The message channel is a method of performing intensity modulation (ASK/Amplitude Shift Keying) by superimposing a low-speed signal light of 50 kbps on a high-speed signal light of 10 Gbps or 25 Gbps, etc. G989.2 has an AMCC (Auxiliary management and control channel) regulation, and there is an over modulation that performs intensity modulation (ASK) of 115 kbps for high-speed signal light. In such a technology in which a low-frequency optical sub-signal is superimposed on a high-frequency optical main signal, a degree of deterioration in the temporal waveform of the optical main signal due to the optical sub-signal is desired to be reduced as much as possible.

In the optical transmitter 3 of the present embodiment, an optical signal based on the high-frequency signal Sa corresponds to the optical main signal, and an optical signal based on the low-frequency signal Sb corresponds to the optical sub-signal. The optical sub-signal is typically represented as an envelope signal of the optical main signal. According to knowledge of the present inventor, an influence of the optical sub-signal on a temporal waveform of the optical main signal is mainly due to a high frequency component contained in the optical sub-signal. That is, when the optical sub-signal is a rectangular wave, as a rise and fall thereof become steeper, high frequency components are included more in the optical sub-signal in addition to the original low frequency components. Then, if a frequency of the high frequency component is close to a frequency of the optical main signal, the frequency component acts as noise in the optical main signal. As a result, deterioration in a temporal waveform of the optical main signal is caused. On the other hand, in the optical transmitter 3 of the present embodiment, the bias supply circuit 15 includes the shaping block 15b as a circuit element for inclining the rising portion and the falling portion of the output of the arithmetic processing circuit 14 containing the low-frequency signal Sb. Thereby, a frequency of the high-frequency component contained in the optical sub-signal based on the low-frequency signal Sb becomes low, and is separated from the frequency of the optical main signal. Therefore, according to the optical transmitter 3 of the present embodiment, a degree of deterioration in a temporal waveform of the optical main signal due to the optical sub-signal can be reduced.

Figure 13:
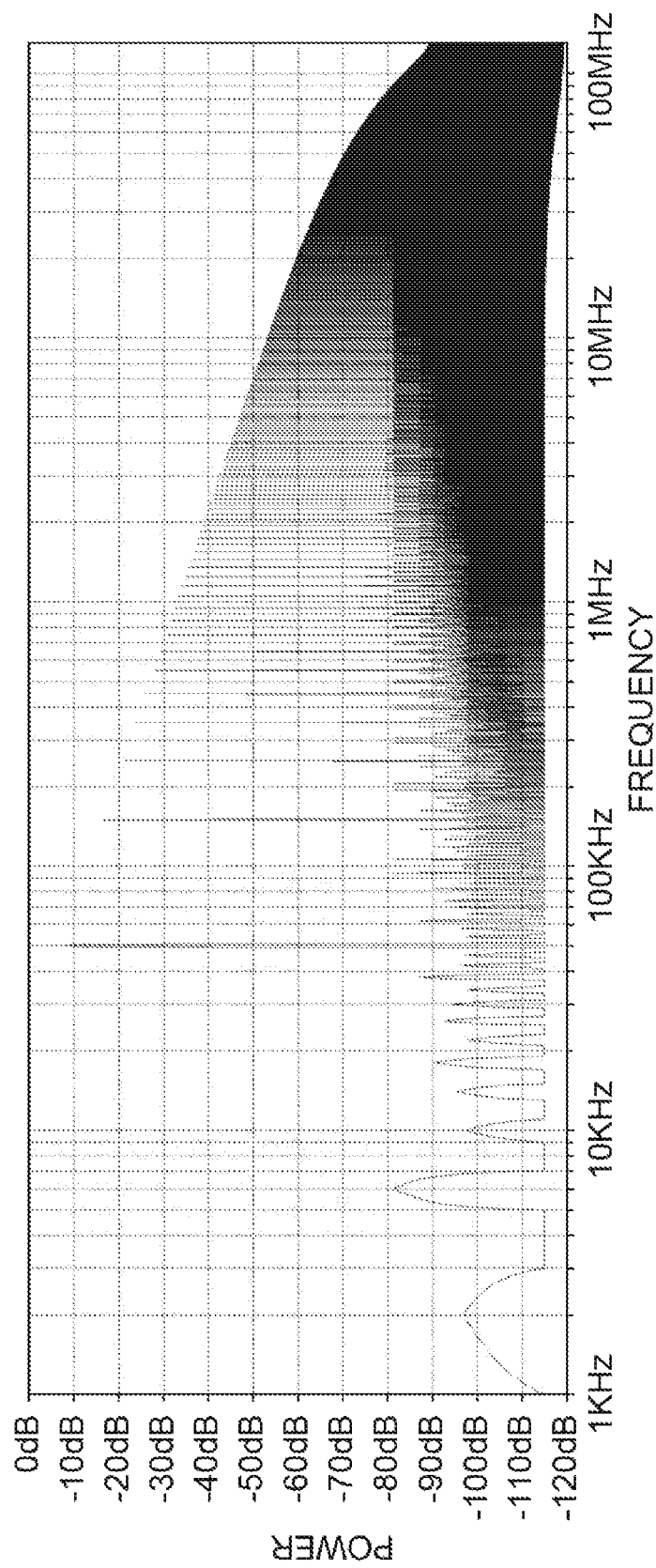
FIG. 13 is a graph showing results in which a fast Fourier transform (FFT) is performed on a rectangular-wave-formed temporal waveform of the low-frequency signal of 50 kHz.
Figure 14:
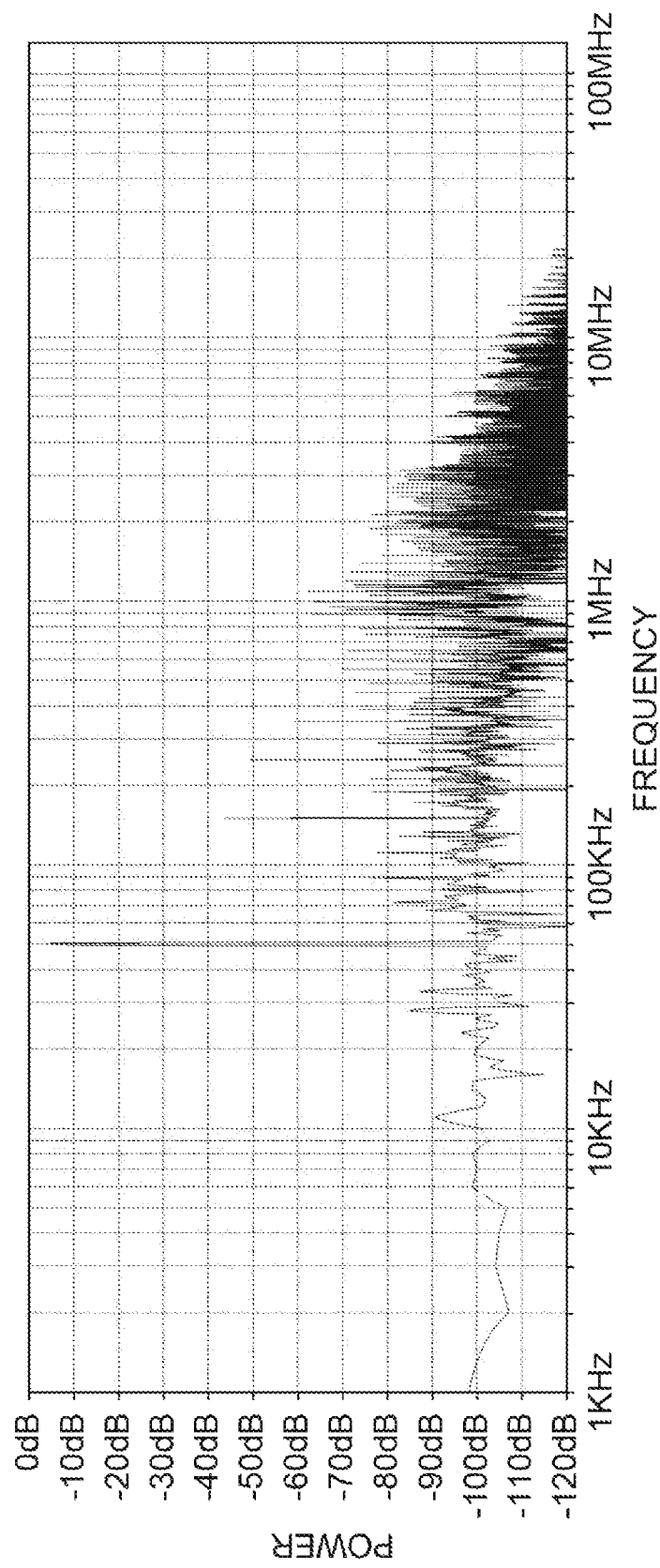
FIG. 14 is a graph showing results in which a fast Fourier transform (FFT) is performed on a rectangular-wave-formed temporal waveform of the low-frequency signal of 50 kHz.
Figure 15:
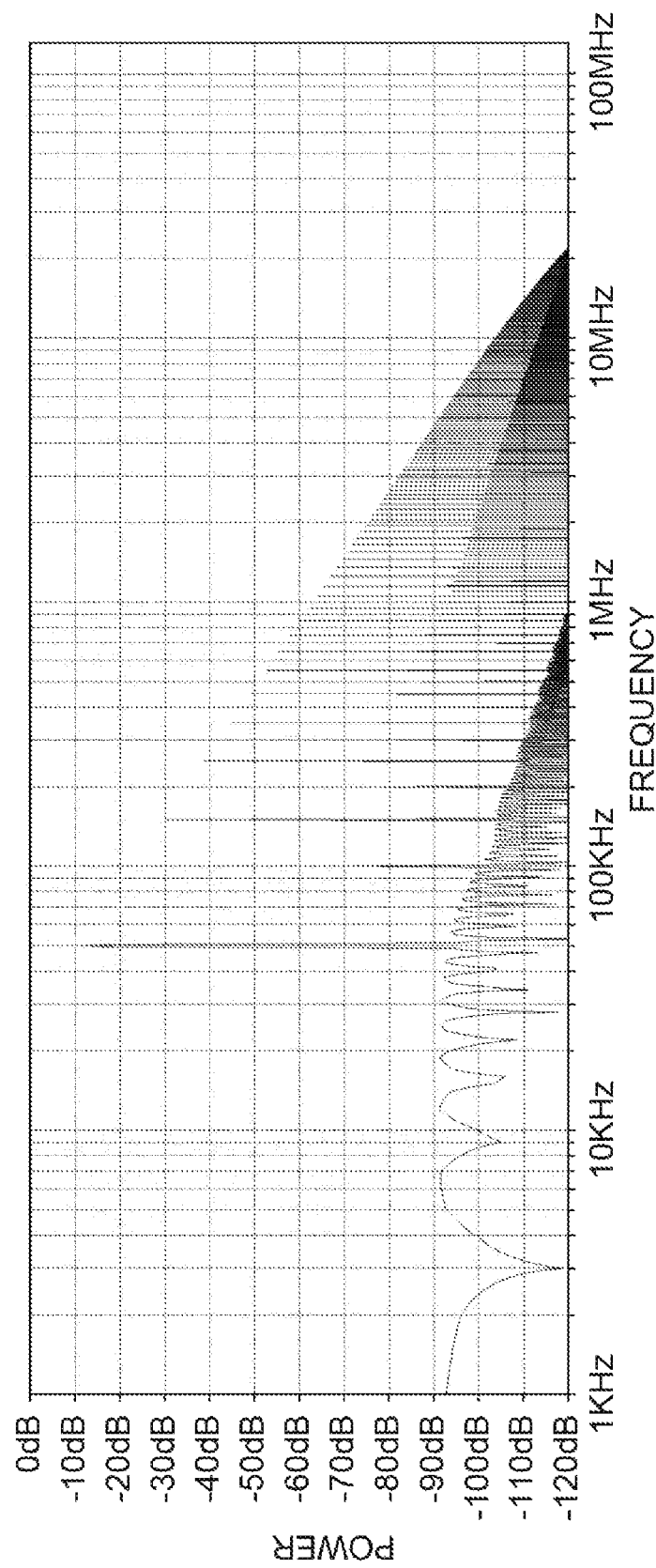
FIG. 15 is a graph showing results in which a fast Fourier transform (FFT) is performed on a rectangular-wave-formed temporal waveform of the low-frequency signal of 50 kHz.

FIGS. 13, 14 and 15 are graphs showing results in which a fast Fourier transform (FFT) is performed on a rectangularwave-formed temporal waveform of the low-frequency signal Sb of 50 kHz. FIG. 13 shows results according to a comparative example when the shaping block 15b of the present embodiment is not provided. FIG. 14 shows results when the rising portion and the falling portion of the low-frequency signal Sb have a sine-wave form (see FIG. 4). FIG. 15 shows results when the rising portion and the falling portion of the low-frequency signal Sb are linear (see FIG. 3). As shown in these, odd-order harmonics appear with the frequency (50 kHz) of the low-frequency signal Sb as a basic frequency. For example, when the LFC of the TIA 17b is 100 kHz, harmonics of a third order or higher of the basic frequency (50 kHz) become noise with respect to the high-frequency signal Sa, and this is considered to be a factor of sensitivity deterioration of the high-frequency signal Sa. A third harmonic of the basic frequency, that is, a peak value of 150 kHz is about −16 dB in the comparative example of FIG. 13, −44 dB in the example of FIG. 14, and −30 dB in the example of FIG. 15. As described above, in the present embodiment, a harmonic reduction effect of about 14 dB to 28 dB can be obtained with respect to the comparative example.

Figure 16:
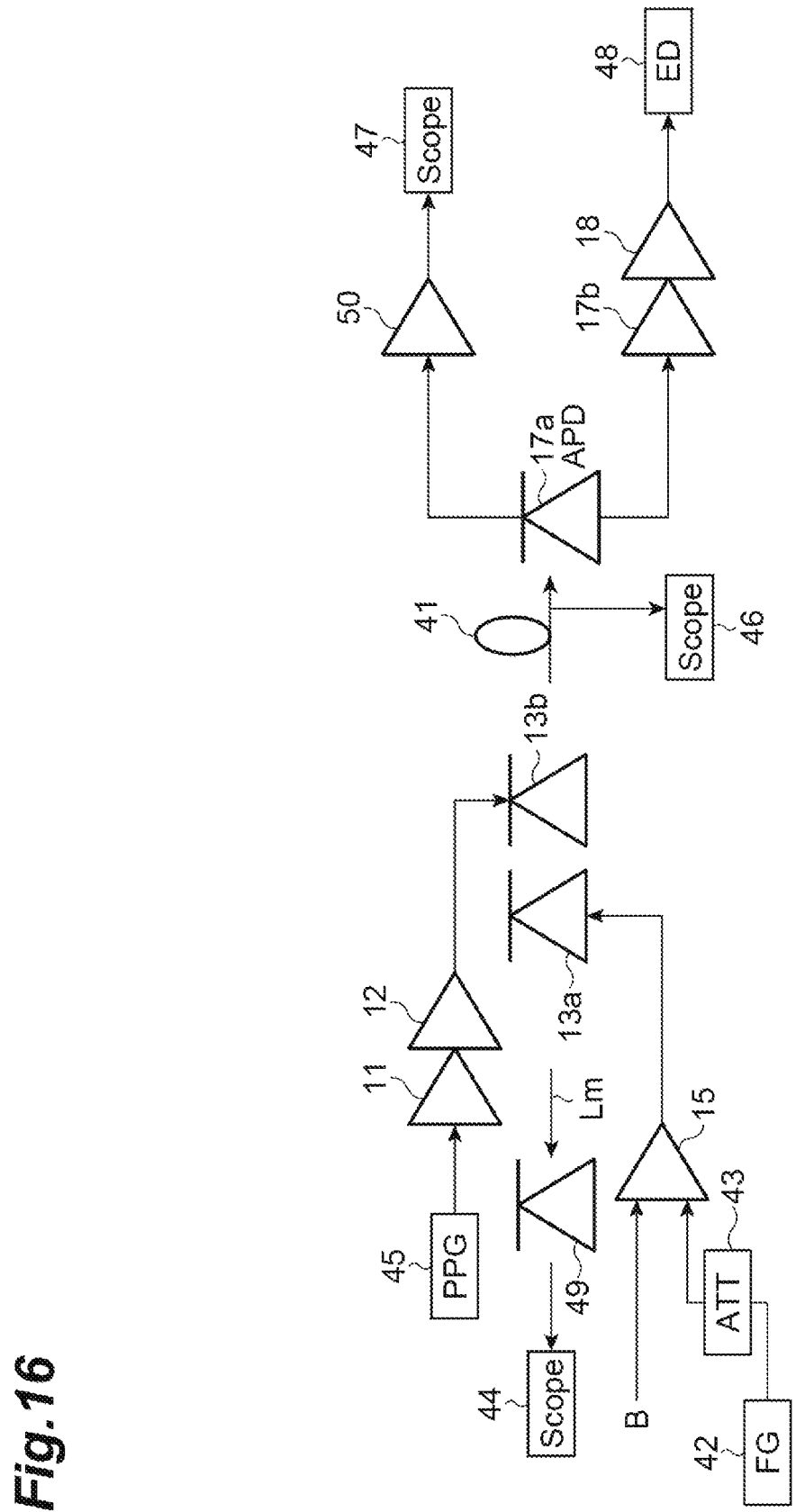
FIG. 16 is a diagram schematically showing a configuration used for evaluating sensitivity deterioration of the high-frequency signal.

The present inventor actually manufactured the optical transceiver 1A of the present embodiment and evaluated a degree of sensitivity deterioration of the high-frequency signal Sa. FIG. 16 is a diagram schematically showing a configuration used for the evaluation. On the optical transmitter 3 side, the low-frequency signal Sb at a frequency of 50 kHz generated by a function generator (FG) 42 was input to the bias supply circuit 15 via an attenuator 43 and superimposed on the direct current bias B. As the function generator 42, one capable of generating a rectangular wave, a sine wave, and a triangular wave was selected. Observation of a temporal waveform and a modulation depth of the low-frequency signal Sb was performed such that light Lm from the light emitting unit 13a is received by a RFM (Rear Facet Monitor) 49, and a waveform of an output signal from the RFM 49 was displayed on an oscilloscope 44. In transmitting signal light from the optical transmitter 3 to the optical receiver 4, a single mode optical fiber 41 (200 ps dispersion) having a length of 12 km was used. On the optical receiver 4 side, an output current from the light receiving element 17a was taken out by the current mirror circuit (RSSI), amplified by an amplifier 50, and then observed by a real time oscilloscope 47. At the same time, a waveform of signal light propagating through the single mode optical fiber 41 was observed with a sampling oscilloscope 46. A speed of the optical main signal was set to 25.78 Gbps. A pseudo-random signal (PRBS-31) was generated by a pulse pattern generator (PPG) 45, received by an error detector (ED) 48, and a bit error rate (BER) was measured.

Figure 17:
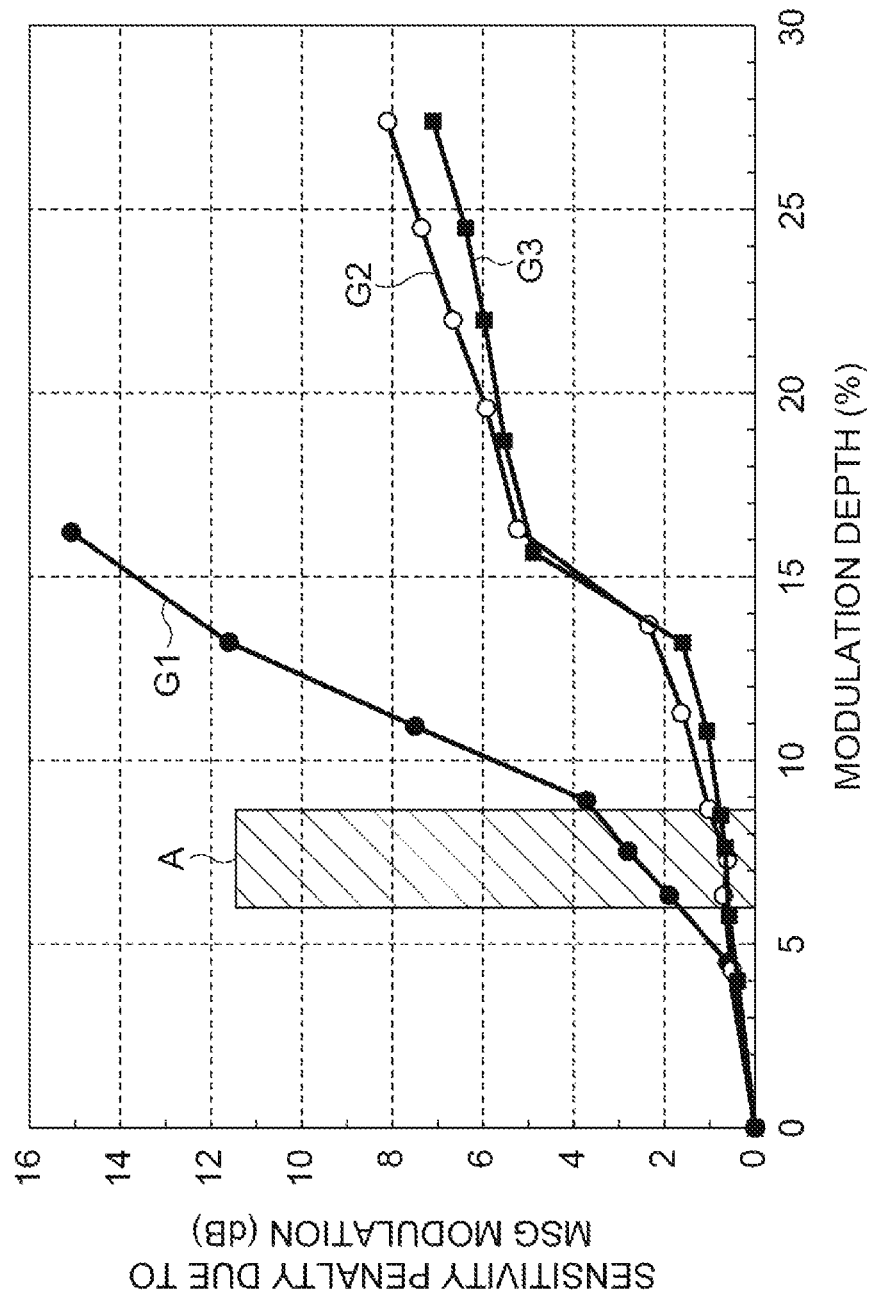
FIG. 17 is a graph showing measurement results of a bit error rate.

FIG. 17 is a graph showing measurement results of a BER in cases in which the low-frequency signal Sb is a rectangular wave, a sine wave, and a triangular wave. In FIG. 17, a graph G1 indicates a case in which the low-frequency signal Sb is a rectangular wave. A graph G2 indicates a case in which the low-frequency signal Sb is a sine wave. A graph G3 indicates a case in which the low-frequency signal Sb is a triangular wave. The vertical axis represents a sensitivity penalty (unit: dB) due to MSG modulation, and the horizontal axis represents a modulation depth (unit: %). A region A in FIG. 17 indicates an allowable range (6% to 8.5%) of a degree of modulation defined in G698.4. Referring to FIG. 17, in the region A, when the low-frequency signal Sb was a sine wave or a triangular wave (graphs G2 or G3), an effect of suppressing the sensitivity deterioration up to a maximum of about 3 dB could be ascertained compared to a case in which the low-frequency signal Sb was a rectangular wave (graph G1).

As in the present embodiment, a temporal waveform of the low-frequency signal Sb output from the shaping block 15b may be a triangular wave. For example, in such a case, a frequency of the high-frequency component contained in the optical sub-signal based on the low-frequency signal Sb becomes low. Therefore, a degree of deterioration in a temporal waveform of the optical main signal due to the optical sub-signal can be effectively reduced.

As shown in FIG. 6, the bias supply circuit 15 may include an n-th delay circuit (the shaping block 15ba) as a circuit element configured to give an n-th delay to the low-frequency signal Sb, and a current generation circuit (the current conversion circuit block 15a) that superimposes the low frequency signal Sb that has passed through the n-th delay circuit and the direct current bias B to generate the bias current Jb. In this case, the n-th delay circuit can act on the low-frequency signal Sb input to the current generation circuit to incline the rising portion and the falling portion of the low-frequency signal Sb. In this case, the n-th delay circuit (the shaping block 15ba) may include the capacitor C2 having one electrode electrically connected to a signal path of the low-frequency signal Sb and the other electrode electrically connected to the reference potential line 155. For example, with such a configuration, an n-th delay circuit (primary delay circuit) having the above-described operation can be realized.

As shown in FIG. 7, the bias supply circuit 15 may include an integrating circuit (the shaping block 15bb) as a circuit element configured to time-integrate the low-frequency signal Sb, and a current generation circuit (current conversion circuit block 15a) configured to superimpose the low frequency signal Sb that has passed through the integrating circuit and the direct current bias B to generate the bias current Jb. In this case, the integrating circuit can act on the low-frequency signal Sb input to the current generation circuit to incline the rising portion and the falling portion of the low-frequency signal Sb.

As in the present embodiment, the optical transmitter 3 may be utilized in an optical transmission system in which a light intensity in a transmission path from an input end to an output end is 6 dBm or less. The optical transmitter 3 of the present embodiment is particularly effective in an optical transmission system in which a maximum light intensity in the transmission path is relatively small as described above, in other words, the optical transmission path is short.

According to the optical receiver 4 of the present embodiment, the optical sub-signal based on the low-frequency signal Sb can be received separately from the optical main signal based on the high-frequency signal Sa.

Second Embodiment

Figure 18:
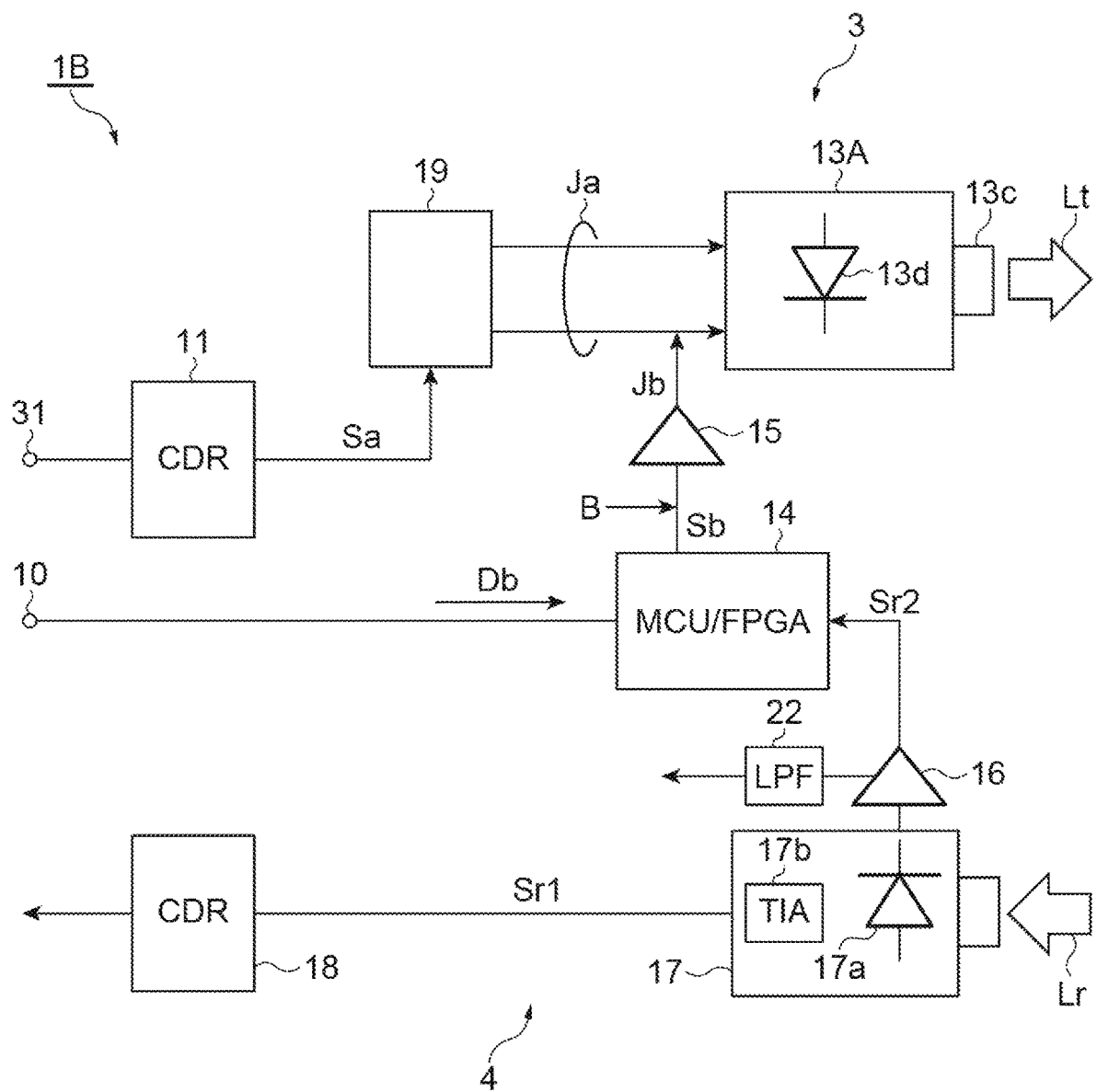
FIG. 18 is a diagram schematically showing a configuration of an optical transceiver according to a second embodiment of the present disclosure.

FIG. 18 is a diagram schematically showing a configuration of an optical transceiver 1B according to a second embodiment of the present disclosure. A difference from the first embodiment described above in the present embodiment is a configuration of the optical transmission module (optical transmission unit) 13A. That is, the optical transmission module 13A of the present embodiment includes a direct modulation type laser element 13d instead of the laser element 13e of the first embodiment. A drive current Ja containing a high-frequency signal Sa (first transmission signal) is input to the laser element 13d from a drive circuit 19 as a direct modulation signal. At the same time, a bias current Jb formed by superimposing a low-frequency signal Sb (second transmission signal) on a direct current bias B is supplied to the laser element 13d from a bias supply circuit 15. That is, a drive current containing the low-frequency signal Sb and the high-frequency signal Sa is supplied to the laser element 13d. Other configurations except for the above are the same as those of the first embodiment.

In the first embodiment, a configuration in which the modulation unit 13b, which is an external modulator, is coupled to the light emitting unit 13a has been employed, but as in the present embodiment, the optical transceiver 1B may be configured to directly drive the laser element 13d. Even in this case, the same operation and effects as those of the first embodiment can be obtained.

The optical transmitter according to the present disclosure is not limited to the above-described embodiments, and various other modifications can be made. For example, in the above-described embodiment, as an example in which the rising portion and the falling portion of the temporal waveform of the low-frequency signal (second transmission signal) are inclined, a triangular wave form, a sine-wave form, and an n-th delay have been exemplified. The inclined waveform of the rising portion and the falling portion are not limited thereto, and various other inclined waveforms may be employed.

REFERENCE SIGNS LIST 1A, 1B Optical transceiver
3 Optical transmitter
4 Optical receiver
10 Input/output end
11 CDR circuit
12 Drive circuit
13, 13A Optical transmission module
13a Light emitting unit
13b Modulation unit
13c Optical output port
13d, 13e Laser element
14 Arithmetic processing circuit
15, 15A, 15B Bias supply circuit
15a Current conversion circuit block
15b, 15ba, 15bb Shaping block
15c Amplification block
16, 16A, 16B Low-frequency signal amplification unit
17 Light receiving module
17a Light receiving element
17b Transimpedance amplifier (TIA)
18 CDR circuit
19 Drive circuit
21, 21A, 21B Capacitor
22 Low-pass filter circuit
23 Resistor
24, 24A, 24B Amplifier circuit
31 Input terminal
41 Single mode optical fiber
42 Function generator
43 Attenuator
44 Oscilloscope
45 Pulse pattern generator
46 Sampling oscilloscope
47 Real time oscilloscope
48 Error detector
49 RFM
50 Amplifier
151 Logic inversion circuit
152, 154 Transistor
153 Operational amplifier
155, 162 Reference potential line
156 Power supply potential line
157 Bias potential line
158, 161, 161A, 161B Operational amplifier
159, 163 Constant potential line
B Direct current bias
db Control data
Ja Drive current
Jb Bias current
Lm Light
Lr Received light
Lt Signal light
N1, N2, N3, N4, N5, N6, N7, N7A, N7B Node
Sa High-frequency signal
Sb Low-frequency signal
Sr1, Sr2 Received signal
Vb Bias voltage
Vd Drive voltage
Vg Voltage
Wa, Wd, Wf Rising portion
Wb, We, Wg Falling portion

The invention claimed is:

1. An optical transmitter comprising:
an optical transmission unit including a laser element;
a drive unit driving the laser element according to a first transmission signal;
an arithmetic circuit generating a second transmission signal; and
a bias supply circuit superimposing the second transmission signal on a bias current of the laser element, wherein
an output of the arithmetic circuit containing the second transmission signal is a digital signal in a rectangular wave form based on a reference clock having a frequency lower than a reference clock frequency of the first transmission signal,
the bias supply circuit includes a circuit element for inclining a rising portion and a falling portion of the output of the arithmetic circuit, and
the bias supply circuit includes:
an n-th delay circuit as the circuit element configured to give an n-th delay (n is an integer of 1 or more) to the second transmission signal; and
a current generation circuit configured to superimpose the second transmission signal which has passed through the n-th delay circuit on the bias current.

2. The optical transmitter according to claim 1, wherein the laser element includes a light emitting unit and a modulation unit, and
the first transmission signal drives the modulation unit.

3. The optical transmitter according to claim 1, wherein the laser element is of a direct modulation type, and
the first transmission signal is input to the laser element as a direct modulation signal.

4. The optical transmitter according to claim 1, wherein a rising portion and a falling portion of a temporal waveform of the second transmission signal output from the circuit element have a delay.

5. The optical transmitter according to claim 1, wherein the n-th delay circuit includes a capacitor having one electrode electrically connected to a signal path of the second transmission signal and another electrode electrically connected to a reference potential line.

6. The optical transmitter according to claim 1, wherein the optical transmitter is utilized in an optical transmission system in which a light intensity in a transmission path from an input end to an output end is 6 dBm or less.

7. The optical transmitter according to claim 4, wherein a flat portion is present between the rising portion and the falling portion in the temporal waveform.

8. The optical transmitter according to claim 4, wherein a flat portion is not present between the rising portion and the falling portion in the temporal waveform.

9. An optical transmitter comprising:
an optical transmission unit including a laser element;
a drive unit driving the laser element according to a first transmission signal;
an arithmetic circuit generating a second transmission signal; and
a bias supply circuit superimposing the second transmission signal on a bias current of the laser element, wherein
an output of the arithmetic circuit containing the second transmission signal is a digital signal in a rectangular wave form based on a reference clock having a frequency lower than a reference clock frequency of the first transmission signal,
the bias supply circuit includes a circuit element for inclining a rising portion and a falling portion of the output of the arithmetic circuit, and
the bias supply circuit includes:
an integrating circuit as the circuit element configured to time-integrate the second transmission signal; and
a current generation circuit configured to superimpose the second transmission signal which has passed through the integrating circuit on the bias current.

10. The optical transmitter according to claim 9, wherein the optical transmitter is utilized in an optical transmitter system in which a light intensity in a transmission path from an input end to an output end is 6 dBm or less.

* * * * *